US006317130B1

(12) United States Patent
Ishikawa et al.

(10) Patent No.: US 6,317,130 B1
(45) Date of Patent: Nov. 13, 2001

(54) APPARATUS AND METHOD FOR GENERATING SKELETON-BASED DYNAMIC PICTURE IMAGES AS WELL AS MEDIUM STORING THEREIN PROGRAM FOR GENERATION OF SUCH PICTURE IMAGES

(75) Inventors: Hirotaka Ishikawa, Tokyo; Kazunori Haruyama, Saitama-ken; Kazuhide Nakazawa, Tokyo, all of (JP)

(73) Assignee: Konami Co., Ltd., Kobe (JP)

( * ) Notice: Subject to any disclaimer, the term of this patent is extended or adjusted under 35 U.S.C. 154(b) by 0 days.

(21) Appl. No.: 08/959,690

(22) Filed: Oct. 29, 1997

(30) Foreign Application Priority Data

Oct. 31, 1996 (JP) .................................................. 8-290598
Oct. 20, 1997 (JP) .................................................. 9-287350

(51) Int. Cl.⁷ ............................. G06T 13/00; G06T 15/70
(52) U.S. Cl. ........................................... 345/473; 345/474
(58) Field of Search ..................................... 345/473, 474

(56) References Cited

U.S. PATENT DOCUMENTS 4,600,919 * 7/1986 Stern .................................... 345/473
5,877,778 * 3/1999 Dow et al. ........................... 345/474

FOREIGN PATENT DOCUMENTS 466 154 A2 * 1/1992 (EP) ............................... G06F/15/72
WO 94/23392 * 10/1994 (WO) ............................. G06F/15/72
WO 93/11525 * 6/1993 (WO) ............................... G09G/1/06

OTHER PUBLICATIONS

Gourrett et al., "Simulation of Object and Human Skin Deformations in a Grasping Task", Computer Graphics, v. 23, n. 3, pp. 21–30, Jul. 1989.*

Van Reeth et al., "Integrating 2 1/2—D Computer Animation Techniques for Supporting Traditional Animation", Proc. Computer Animation '96, Institut of Electrical and Electronics Engineers Comp. Soc. Press, pp. 118–25, Jun.1996.*
Brutnyk, N. et al., "Interactive Skeleton Techniques for Enhancing Motion Dynamics in Key Frame Animation", Computer Graphics, Graphics, v. 10, n. 2, p. 51, Jul. 1976.*
Hsu, Siu Vhi et al., "Drawing and Animaiton Using Skeletal Strokes", Proc. of the 21st Siggraph Conference, Association of Computing Machinery, pp. 109–118, Jul. 1994.*
Granieri, J.P. et al., "Production and Playback of Human Figure Motion for 3D Virtual Environments", Proc. Virtual Reality Annual International Symposium '95, Institut of Electrical and Electronics Engineers Comp. Soc. Press, pp. 127–135, May 1995.*
Mizuno, Hinori et al., "Computer Graphic of Walking Quadruped Animal", Systems and Computers in Japan, v. 26, n. 4, pp. 84–94 (translated in 1995), Jun. 1994.*

* cited by examiner

Primary Examiner—Mark R. Powell
Assistant Examiner—Jeffrey Allen Rossi

(57) ABSTRACT

Enabling an animation character object, which is pictorially deformed by computer graphics techniques to visually represent human body or animal or the like in the form of a caricature or model, to offer precise and more natural motions at its selected constituent portions that have inherently no joints and no bones by giving thereto joints and skeletons. To this end, apparatus and method for generating skeleton-based animation images in accordance with the principles of the invention include solving means as follows. A face section of a cubic character object is provided with auxiliary skeletons as vertically coupled together. Skeletons are provided which extend from respective endpoints of such auxiliary skeletons and are coupled defining an umbrella shape as a whole. These skeletons are associated with models each consisting of an ensemble of polygons for rendering the character deformable by changing rotation amount of each skeleton.

9 Claims, 26 Drawing Sheets

| ADD | LABELS |
|-----|--------|
|     | WALK   |
|     | RUN1   |
|     | RUN2   |
|  ⋮  |   ⋮    |
|     | JUMP   |

APPARATUS AND METHOD FOR GENERATING SKELETON-BASED DYNAMIC PICTURE IMAGES AS WELL AS MEDIUM STORING THEREIN PROGRAM FOR GENERATION OF SUCH PICTURE IMAGES

BACKGROUND OF THE INVENTION

1. Field of the Invention

The present invention relates to an apparatus and method for generating dynamic picture images by effectuating polygon mapping using skeletons which are adaptable for use in advanced computer graphics architecture including but not limited to home-use television (TV) game machines. The invention also relates to storage or record media storing therein a software program for creation of such movable picture images for visual presentation on the screen of an associated display unit.

2. Description of the Related Art

Where an attempt is made to precisely represent movement or motions of a three-dimensional (3D) model structured from polygons, the resulting polygons increase in number causing workload of an associative central processing unit (CPU) to likewise increase when the CPU is designed to calculate endpoint coordinates on a mere step-by-step bases (vertex difference animation scheme), which in turn makes it difficult to move a model(s) on a real time basis. Especially, such prior known approach is not adaptable for use with TV games which are designed to allow more than one model to exhibit various kinds of motions or "actions" in rapid response to game player's operations of several types of key buttons of his or her game machine.

In recent years one scheme has been employed which utilizes multi-joint structures for enabling several kinds of actions to be by use of skeletons coupling between joint sections. This scheme using such multijoint structures will be briefly explained with reference to FIG. 26. In FIG. 26, a graphics image object 90 represents an animation character corresponding to a model of a human body, which object has a multijoint bone structure with a number of joints 91 at certain locations identical to those of real human joints. Adjacent ones of the joints 91 are coupled together by a corresponding one of bones 92 referred to as the "skeletons" in the art of computer graphics. Of those skeletons 92, one skeleton 92a coupled at one reference point A0 indicative of a joint 91 corresponding to the waist of human body is treated as a "parent" skeleton which is vectorically defined with such reference point A0 being as an origin. Further, its following skeletons 92 which are sequentially coupled from the parent skeleton 92a, head, both hands and both legs in this order are vectorically defined in a way such that one of them is defined by vector with an endpoint or tip of its upstream side one being as a reference. A surface of character 90 is three-dimensionally represented by a model which consists of a predefined number of polygons as defined in a way corresponding to respective skeletons 92. Where movement or motion is given to the model, respective skeletons 92 are sequentially supplied with vector data (what is called the "joint angle" data) in accordance with such intended motion causing a polygon associated with each skeleton 92 to be displayed while changing its position and/or angle in response to sequential movement of skeleton 92, which in turn leads to capability of visual presentation of the model's moving action. This scheme may be similarly applicable to cases of displaying animals as models in such a way that a modelled animal image is graphically defined for achievement of its motion as a multijoint structure having joints at locations corresponding to joints of a real animal.

The prior art multijoint structure based motion creation scheme with graphical joints being given to those joint locations of a real body offers capability of merely relatively simple actions of an animation character being displayed in operative corporation with angle data preset to skeletons, such as tilting and expansion/shrinking motions of its back, arms and legs—namely, partial bending and stretching actions—and also remains ineffective for providing more complicated actions to such character as presently displayed. Accordingly, applying to TV games such animation character with mere partial bending/stretching motion capabilities makes it impossible to accomplish a wide variety of character's complicated motions or actions as demanded by operators or "game players," which might disadvantageously serve as a serious bar to creation of idea-rich and enjoyable TV game software.

SUMMARY OF THE INVENTION

It is therefore an object of the present invention to provide improved three-dimensional (3D) graphics image creation apparatus and method capable of avoiding the problems faced with the prior art.

It is another object of the invention to provide improved apparatus and method for generating skeleton-based 3D dynamic picture images of animation characters as modelled or deformed to represent natural creatures including human and animals, capable of permitting more natural and precise actions by supplying joints and skeletons to those constituent portions without inherent joints and bones thus enabling development of more interesting idea-rich TV games.

It is yet another object of the invention to provide a recording medium having stored thereon a software program for creation of skeleton-based 3D movable graphics images of character objects representative of human bodies and animals, capable of permitting more natural and smooth actions thereof on a display screen.

In accordance with an aspect of the present invention, apparatus for generating a skeleton-based movable picture image includes a storage device for storing therein spatial coordinate data of skeletons as coupled together and a model associated with each skeleton, and a calculator unit for sequentially taking skeletons out of the storage and for calculating based on such data a display position of the model associated with each skeleton on a two-dimensional (2D) display screen, wherein the storage is specifically arranged to store an auxiliary skeleton which is not part of the model at a certain location corresponding to an immediately upper stream of the lowest stream of skeleton.

With such an arrangement, skeletons are set to respective models as made up of one or a predefined number of polygons. Each skeleton defines relative position attitude of its corresponding polygon of model; when such skeleton is specified, a display state of such polygon, i.e., model, on a 2D display screen is determined. Preset data items concerning coordinates and rotation amount as well as length for specifying skeletons are stored in advance or "prestored" and are read sequentially, when displaying of a character, with respect to a plurality of skeletons in a predetermined order of sequence permitting sequential data fetching or acquisition. And, providing the auxiliary skeleton on a halfway point may increase the degree of freedom for placing a lowest stream skeleton defining its corresponding model at a preferable position with respect to the shape of the character when setting of the relative position attitude of this model. Whereby, a setting of the relative position attitude of the lowest stream skeleton and its corresponding model may be made much easier while enabling the model to exhibit any precise and smooth motions or actions as desired by system designers. Further, since the auxiliary skeleton serves no part in model displaying, software design may be done only in view of positional relation with the lowest stream skeleton.

In accordance with another aspect of the present invention, apparatus for generating a skeleton-based movable picture image includes a storage device for storing therein skeletons as provided for defining the relative positional attitude of polygons acting as display elements of a character object and models each essentially consisting of a predefined number of polygons as associated with each skeleton, and an arithmetic processor responsive to rotation amount data supplied in response to an operation unit as one of elements for definition of the skeletons, for determining by calculation a display position of a model associated with each skeleton on a 2D display screen, wherein a constituent portion structured from one or a specified number of models is deformable, wherein respective skeletons each corresponding to the constituent portion are stored in the storage in a mutual associative manner thereby rendering the rotational amount data for movement of a corresponding model successfully readable in the time-base direction.

With such an arrangement, the display position of a model associated with each skeleton on the 2D display screen is calculated based on the rotation amount which is one element for skeleton definition, thereby allowing an animation or cartoon character object consisting of an ensemble of models to be visually indicated on the display screen. A constituent portion consisting of one or several models to form part of the character remains freely deformable.

It should be noted that the term "deformation" as used herein may refer to a partial change or modification of the shape of certain portions which have inherently no joints—such as vertical, lateral, or simultaneous distortion of cubic objects, waving of long hair (capillus, animal's tail), open and close movements of upper and lower eyelids, arms' swinging, by way of example—rather than bending and stretching actions about joints, such as bending of arms, legs, wrist and ankles or bending of neck.

This constituent portion is associated with a plurality of skeletons while causing rotation amount data defining respective skeletons to be set as timebase contents (pattern data) which may permit relative and cooperative motions of models of this constituent portion.

In accordance with still another aspect of the present invention, the constituent portion has a cubic like shape, wherein skeletons as contained in such cubic portion are such that a desired number of ones are provided defining an umbrella in shape. With such an arrangement, the cubic constituent portion offers deformability such as transformation to an ellipse. Whereby, the cubic constituent portion may be freely transformable exhibiting vertical or lateral enlargement in deference to the character's actions, such as jumping, to thereby enable successful reproduction of desired character's actions with enhanced naturalness and increased approximation of real motions.

In accordance with a further aspect of the present invention, the apparatus set forth in claim 3 is arranged such that a plurality of skeletons are included within the cubic portion which skeletons are those of no relevancy to polygons as vertically coupled together, wherein umbrella-like skeletons are provided and elongated from at least two locations of an endpoint or tip of the auxiliary skeleton defining an umbrella shape. With such an arrangement, in cases where umbrella-like skeletons are provided from two or more locations on the upper and lower sides of the auxiliary skeleton, more precise and accurate deformation of a cubic object may be attainable; for example, it becomes possible to allow its upper and lower sides to deform cooperatively and also permit simultaneous deformation of them.

In accordance with a still further aspect of the present invention, the constituent portion includes an ensemble of image components indicative of long hair extending from part of a character object with a plurality of skeletons being serially coupled together covering from a hair root up to a hair tip. With such an arrangement, long hair is subdivided into a plurality of parts along the length thereof with skeletons corresponding thereto respectively; accordingly, it becomes possible to cause hairy and/or tail sections with no actual joints to wave or swing in a more natural fashion.

In accordance with a yet further aspect of the present invention, the constituent portion includes image components indicative of both breasts of a character object resembling the upper half body of an adult human female while causing two skeletons extending in parallel from the same position to have respective tips as coupled to respective skeletons corresponding to the constituent portion. With such an arrangement, it is possible to reproduce the right and left breasts of a character object in a way such that these may wave cooperatively—simultaneously or laterally or even alternately—in responding to actions as performed thereby.

In accordance with a yet further aspect of the present invention, the constituent portion includes image components representative of upper and lower eyelids of a character object while causing respective skeletons corresponding to the constituent portion to be disposed in parallel to ensure that these correspond from the same position to the upper and lower eyelids respectively. With such an arrangement, it becomes possible to permit such object to open or close its eyes by causing the upper and lower eyelids to come closer or go far from each other at a constituent portion consisting of such upper and lower eyelids.

In accordance with a yet further aspect of the present invention, a method is provided for generating a skeleton-based dynamic picture image by sequentially fetching data of skeletons coupled together in a predefined sequence and then calculating based on resultant data a display position of a model associated with each skeleton on a 2D display screen, the method including the steps of placing an auxiliary skeleton with no relevancy to a model at a specific location on an immediately upper stream side of the lowest stream of skeleton, and successively executing fetch or acquisition of data of the lowest stream skeleton after completion of fetching of the auxiliary skeleton.

With such a method, skeletons are defined for respective models each consisting of one or several polygons. Each skeleton defines relative position attitude of the individual one of those polygons of a corresponding model; specifying a skeleton determines a display state of such polygon, i.e. model, on the 2D display screen. Preset data items indicative of coordinates, rotation amount and length are prestored allowing upon displaying of a character any necessary data items to be read sequentially with respect to plural skeletons in a predefined order of sequence. And, placing the auxiliary skeleton at an immediately upstream location of the lowest stream of skeleton may advantageously serve to increase the degree of freedom for providing certain skeleton defining its corresponding model at a preferred position in the character's shape during setting of the relative position attitude of the model. This makes it much easier to set the relative position attitude of the lowest stream skeleton and its corresponding model while at the same time providing the model with any precise and more natural motions or actions as desired by system designers. Furthermore, since the auxiliary skeleton remains free from or independent of the model displaying procedure, design complexity may be reduced due to the fact that any intended design is completed only in view of positional relation with the lowest stream skeleton while simultaneously enabling facilitation of settings thereof.

In accordance with a yet further aspect of the present invention, a method is provided for generating a skeleton-based movable picture image comprising the steps of providing one or more skeletons for use in defining the relative positional attitude of polygons acting as display elements of a character object, causing each skeleton to be associated with a model consisting of an ensemble of a predefined number of polygons, and calculating based on rotational amount data given in response to key/button operations as one element for definition of the skeleton the display position of a model associated with each skeleton on a 2D display screen, the method further comprising defining as part of the character object a deformable constituent portion constructed from one or a plurality of models, adding timebase rotational amount data to each of the skeletons corresponding to the constituent portion, and effectuating deformation while letting corresponding models be associated with each other.

With such a method, the display position of a model associated with each skeleton on 2D display screen is calculated based on the rotation data being as one element defining a skeleton, thereby allowing a character consisting of a group of models to be displayed on the screen. A constituent portion made up of one or several models to constitute part of the character remains deformable in shape. The term "deformation" is the same as stated supra. And, this constituent portion is associated with plural skeletons allowing them to cooperatively move in deference to timebase rotation amount data defining respective skeletons.

In accordance with a yet further aspect of the present invention, a program is provided for generating a skeleton-based movable picture image by sequentially fetching data of skeletons coupled together in a specified order of sequence and then calculating the display position of a model associated with each skeleton on a 2D display screen, wherein an auxiliary skeleton with no relevancy to a model is placed at certain location in the immediate upper stream of the lowest stream of skeleton while causing fetch of the lowest stream skeleton to be performed in a way successive to fetching of the auxiliary skeleton data.

With this, placing the auxiliary skeleton at certain location on the immediate upstream side of the lowest stream skeleton may increase the degree of freedom for disposing an intended skeleton of the lowest stream defining its corresponding model at a desired position in the character's shape during setting of relative position attitude of the model. Whereby, a setting of the relative position attitude of the lowest stream skeleton and its corresponding model may become much easier while enabling the model to exhibit any precise motions or actions as desired by system designers. Further, since the auxiliary skeleton has no relationship with model displaying, design may be done by taking account of only positional relation with the lowest stream skeleton while rendering its settings much easier.

In accordance with a yet further aspect of the present invention, a record carrier medium is provided which stores therein a program for generation of a skeleton-based dynamic picture image by providing skeletons for use in defining the relative positional attitude of one or several polygons which are display elements of a character object, causing each skeleton to be associated with a model that essentially consists of an ensemble of predefined number of polygons, and calculating based on rotational mount data given in response to key operations as one of elements defining the skeletons a display position of a model associated with each skeleton on a 2D display screen, the program further comprising defining as part of the character object a deformable constituent portion structured from one or a plurality of models, adding timebase rotational amount data to each of those skeletons corresponding to the constituent portion, and allowing corresponding models to be given with mutually related movement or motions.

With this medium, the constituent portion is associated with plural skeletons allowing them to move cooperatively in deference to timebase rotation mount data defining respective skeletons.

These and other objects, features and advantages of the invention will be apparent from the following more particular description of preferred embodiments of the invention, as illustrated in the accompanying drawings.

BRIEF DESCRIPTION OF THE DRAWINGS

FIGS. 25A and 25B illustrate graphics images representative of the upper half body of a fourth exemplary female character further usable in the invention as configured of multiple skeletons and polygons, wherein FIG. 25A shows its side view whereas FIG. 25B is a front view thereof.

DETAILED DESCRIPTION OF PREFERRED EMBODIMENT

Figure 1:
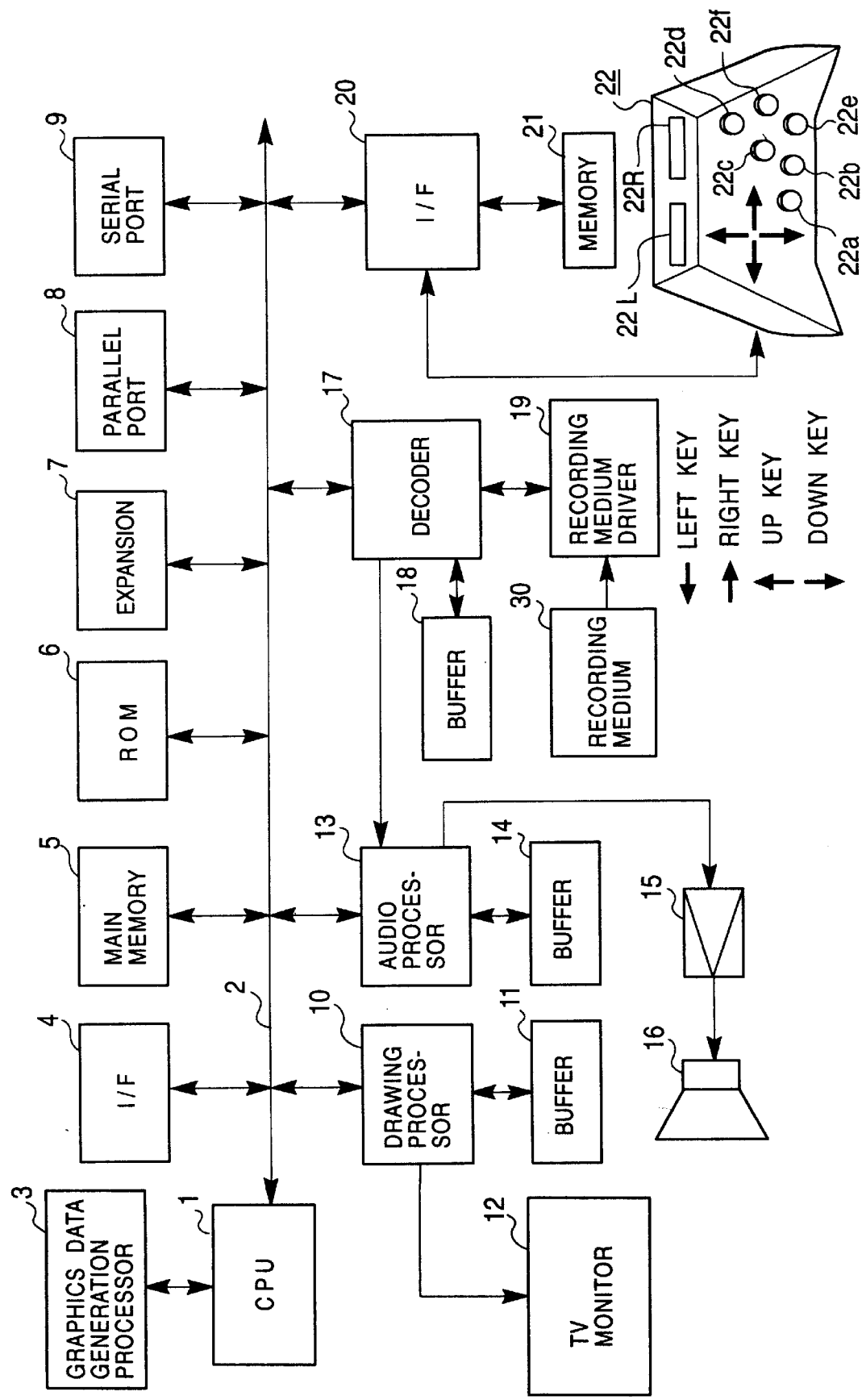
FIG. 1 is a diagram showing a configuration of a game system in accordance with one preferred embodiment of the invention.

FIG. 1 is a diagram showing a configuration of one typical television (TV) game system in accordance with one preferred embodiment of the instant invention.

The game system shown in FIG. 1 includes a game machine main body and an associative recording or storage medium 30 prestoring therein software programs and data. The game machine main body includes a CPU 1, and a bus 2 connected to the CPU 2 which bus has address, data and control bus lines. The game machine also includes a graphics data generation processor 3, interface circuit 4, main memory 5, read-only memory (ROM) 6, expansion processing circuit 7, parallel port 8, serial port 9, graphics drawing processor 10 with buffer 11, audio processor 13 with buffer 14, decoder 17 with buffer 18, interface circuit 20 and memory 21, these components being interconnected with the bus 2 as shown in FIG. 1. Further, a TV monitor unit 12 is connected to drawing processor 10; a loudspeaker 16 is connected to audio processor 13 via an amplifier circuit 15; a storage medium driver 19 is connected to decoder 17; and, a memory 21 and controller 22 are connected to interface circuit 20.

The game system will be different in configuration depending on its practical applications. More specifically, in cases where the game system is designed as a home-use machine, the TV monitor (referred to as "monitor" hereinafter) 12 and loudspeaker 16 will be separated from the game machine main body. Alternatively, where this system is designed as an office-use one, the parts or components shown in FIG. 1 are assembled together in a single integral housing structure. Still alternatively, when the game system is designed for use in digital communications systems with personal computers (PCs) and workstations serving as key terminals, the monitor 12 may correspond to a PC display unit; the drawing processor 10, audio processor 13 and expansion circuit 7 correspond to part of software program data stored in storage 30 or alternatively hardware on extension boards as built in computer expansion slots, respectively; and, the interface circuit 4, parallel port 8, serial port 9 and interface circuit 20 correspond to the hardware on expansion boards in computer expansion slots. The buffers 11, 14 and 18 correspond to the main memory 5 or respective areas of an expansion memory (not shown). The following description assumes that the game system is designed as a home-use product, by way of example.

Respective elements shown in FIG. 1 will next be explained.

The graphics data generation circuit 3 functions as a coprocessor of the CPU 1. More specifically, this graphics data generator 3 performs by parallel processing architecture several kinds of arithmetic processing operations including but not limited to coordinate conversion, light source calculation, and fixed point-formatted matrix or vector computation. Main processing of the graphics data generator 3 may involve calculating on-screen addresses of an image being processed based on coordinate data of each endpoint or vertex on a 2D or 3D surface of image data and rotation amount data as supplied from CPU 1, returning resultant address data to CPU 1, and calculating image luminance or intensity in accordance with the distance from a virtually defined light source.

The interface circuit 4 is operable to provide interface functions for associated peripheral devices, typically a pointing device such as a mouse, track-ball or the like. The ROM 6 is for use in storing therein program data as the operating system (OS) for the game system. For PCs, this may be equivalent to the basic input/output system (BIOS).

The expansion circuit 7 operates to effectuate intended expansion processing with respect to compressed graphics images as digitally compressed by intracoding techniques satisfying the moving pictures experts group (MPEG) standards for dynamic picture images or joint photographic experts group (JPEG) standards. Such expansion processing may be decoding (typically, decoding of data as encoded by variable length code or "VLC" architecture), inverse quantization, inverse discrete cosine transformation (IDCT), intraimage modulation or others.

The drawing processor 10 is for executing drawing processing with respect to buffer 11 based on drawing commands as issued from CPU 1.

Buffer 11 has therein a display area and non-display area. The display area is for use in temporarily storing data of images being displayed on the screen of monitor 12. In this embodiment the nondisplay area is used for storage of specific data items including but not limited to model data defining polygons, movement data causing models to move, pattern data indicative of respective motions or "actions," texture data, and color palette data. The texture data may here be 2D image data. The color palette data may be for designation or assignment of colors of texture data. These data items are prestored in nondisplay area of buffer 11 under control of CPU 1 in a way such that all of them are stored at a time or, alternatively, are divisionally stored at multiple instants in conformity with the progressive situation of a game.

The drawing commands or instructions may include drawing commands for depiction of 3D graphics images using polygons, and commands for depiction of ordinary 2D images. The term "polygon" may refer to one basic surface primitive of 2D images as defined by a closed plane figure bounded by multiple straight lines; in this embodiment, triangles or rectangles are employed.

Those drawing commands for drawing or "depicting" intended 3D images using polygons may involve polygon vertex address data stored in the display area of the buffer 11, texture address data indicative of storage locations on buffer 11 of texture data to be adhered to polygons, color palette address data representative of storage locations on buffer 11 of color palette data indicating colors of texture data, and intensity data indicative of intensity of texture.

Of those data items, the polygon vertex address data in display area is originated from replacement with graphics data generation processor 3's coordinate conversion or transformation of the polygon vertex coordinate data in 3D space from CPU 1 to 2D polygon vertex coordinate data based on shift amount data and rotation amount data of the display screen per se. The intensity data may be determined by graphics data generator processor 3 based on the distance between a position or location defined by the coordinate-converted polygon vertex coordinate data from CPU 1 and a virtually disposed light source.

The polygon vertex address data digitally indicates an address in the display area of buffer 11. The drawing processor 10 is operable to write texture data corresponding to the range or coverage of display area of buffer 11 as indicated by three or four polygon vertex address data.

A single object displayable as a graphics image is structured from multiple polygons. The CPU 1 causes buffer 11 to store therein 3D coordinate data of each polygon in a way such that the data is related to (or associated with) vector data of a corresponding skeleton as will be described in detail later in this description. Where an animation character object image is to be moved on the display screen in response to key/button operations at the controller 22, in other words, when an attempt is made to represent movement of such character per se or to change the position looking at the character (viewpoint position), the following processing is performed.

The CPU 1 operates to supply graphics data generation processor 3 with 3D coordinate data of each polygon held in the nondisplay area of buffer 11 and each polygon's shift/rotation amount data as obtained from the coordinates of the resulting skeleton calculated using Equation 1 to be later presented and its rotation amount data. Graphics data generation processor 3 is responsive to receipt of each polygon's 3D coordinate data and each polygon's shift and rotation amount data for sequentially calculating or computing respective resultant polygons moved and rotated. Of those 3D polygon coordinate data items, vertical and horizontal directional coordinate data may be passed to the drawing processor 10 as the address data in the display area of buffer 11, i.e. polygon vertex address data. Drawing processor 10 is operative to write texture data indicated by preassigned texture address data into a triangular or rectangular display area of buffer 11 as defined by three or four polygon vertex address data, thereby allowing monitor 12 to display thereon an intended object with such texture data adhered to multiple polygons.

Drawing instructions for instruction of drawing ordinary 2D images may consist of vertex address data, texture address data, color palette address data indicative of the storage location in buffer 11 of color palette data representing colors of texture data, and intensity data representative of the intensity or luminance of such texture. Of those data items, the vertex address data may be coordinate data as obtainable by graphics data generation processor 3's coordinate transformation from the vertex coordinate data on 2D plane as fed from CPU 1 based on the shift amount data and rotation amount data from CPU 1 also. Such drawing processing will be referred to as "issuing drawing instruction (s)" hereinafter.

The audio processor 13 is for writing into buffer 14 application developed pulse code modulation (ADPCM) data read out of storage 30 causing such ADPCM data to be used as a sound source. Audio processor 13 then operates to read ADPCM data in a synchronized manner with a clock signal of 1 kilohertz (KHz) frequency. Audio processor 13 next forces resultant ADPCM data read from buffer 14 to be subject to several processings including but not limited to pitch conversion, noise addition, envelop setting, level setting, and reverve addition. Where audio data as read from storage 30 are PCM data such as digital audio signals of compact discs (CDs)—say, "CD-DAs"—or the like, such is converted by audio processor 13 into ADPCM data. The processing by program data for such PCM data is directly carried out within the memory space of the main memory 5. The resulting PCM data as processed within main memory 5 may then be passed to audio processor 13 for conversion to ADPCM data and thereafter supplied to loudspeaker 16 for reproduction of audible sound and/or voice.

The storage driver 19 may typically be fixed or "hard" disk drive, optical disc drive, flexible diskette drive, silicon disk drive, cassette medium reader, or equivalents thereto. The storage medium 30 may be a hard disk, optical disk or disc, flexible diskette, semiconductor memory or equivalents thereof. Storage driver 19 operates to read video, audio and program data out of storage 30, which are then transferred to the decoder 17. Decoder 17 is for applying error correction code (ECC) processing to playback or reproduction data output from driver 19 generating and issuing error-corrected data toward either main memory 5 or audio processor 13.

The memory 21 may consist of a memory device of the card type and its associative holder. The card-like memory is for retaining a variety of kinds of game parameters—such as storing the interrupted state of a game, for example.

The controller 22 comes with several operation keys or buttons including a right trigger button 22R, left trigger button 22L, start button 22a, cross key unit consisting of an upgoing or "UP" key U, down key D, right key R, left key L, cancel button 22c, select button 22d, button unit 22e, analog stick 22f, and a determination or "enter" key (not shown in FIG. 1) on the rear surface of controller 22.

The cross key 22b and analog stick 22f are for allowing an operator or game player to provide CPU 1 with commands for movement of a character object upward, downward, rightward, or leftward on the display screen of monitor 12. The upward and downward—i.e. vertical—movement may refer to jumping actions (JUMP) whereas rightward and leftward—i.e. horizontal—movement may be walking (WALK), running (RUN1, RUN2) actions of the character being displayed. Respective forms in right and left directions are such that each may be distinguishable from the other upon simultaneous operations of the right and left trigger buttons 22R and 22L.

The start button 22a is for permitting the game player to instruct the CPU 1 startup of a game program data as loaded from storage 30. The cancel button 22c is for instructing CPU 1 returning at an immediately prior stage with once-determined items cancelled. Select button 22d is to allow the game player to give to CPU 1 several instructions as to his or her selections pertaining to the game program data as loaded from storage 30 into main memory 5. Button unit 22e is for instructing CPU 1 to switch viewpoint within the virtual space of such game being visualized.

Additionally, the right and left trigger buttons 22R, 22L and enter button on the rear of controller 22 will differ in function depending upon kinds of game program data loaded from storage 30; by way of example, in some fighting games, these are so set as to offer several kinds of attacking actions of a character being displayed.

An operation of the illustrative game system is as follows. A power switch (not shown) is turned on rendering the game system operative. When this is done, if the storage 30 is set in driver 19 then CPU 1 operates based on the OS in ROM 6 to instruct driver 19 to read the program data out of storage 30. In responding, driver 19 reads from storage 30 video, audio and program data, which are supplied to decoder 17 for execution of error correction processing. The resulting error-corrected image data from decoder 17 are then passed via bus 2 to expansion circuit 7, which attempts to perform the expansion processing stated supra generating expanded data which are then fed to drawing processor 10. This processor 10 writes input data into the nondisplay area of buffer 11. Additionally, resultant audio data error-corrected at decoder 17 are routed to audio processor 13 for being written into either main memory 5 or buffer 14.

Similarly, the program data error-corrected at decoder 17 are fed to main memory 5 and written therein. During operation following this, CPU 1 provides control based on the game program data stored in memory 5 and contents of any instructions from the game player through controller 22 to ensure that the game progresses in an expected way. In other words, CPU 1 is responsive to receipt of instructions or commands from the player via controller 22 for adequately providing image processing control, audio processing control, and internal processing. The image processing control may involve later-described calculation of coordinates of each skeleton, calculation of coordinates of polygons, supplying resultant 3D coordinate data and viewpoint position data to graphics data generation processor 3, issuing drawing commands containing the address data in the display area of buffer as determined by graphics data generation processor 3 and associative intensity data, and others. The audio processing control may include issuing audio output commands to processor 13, assigning levels and reverve and the like. The internal processing control may be computation in deference to operations of controller 22, for example.

Figure 2:
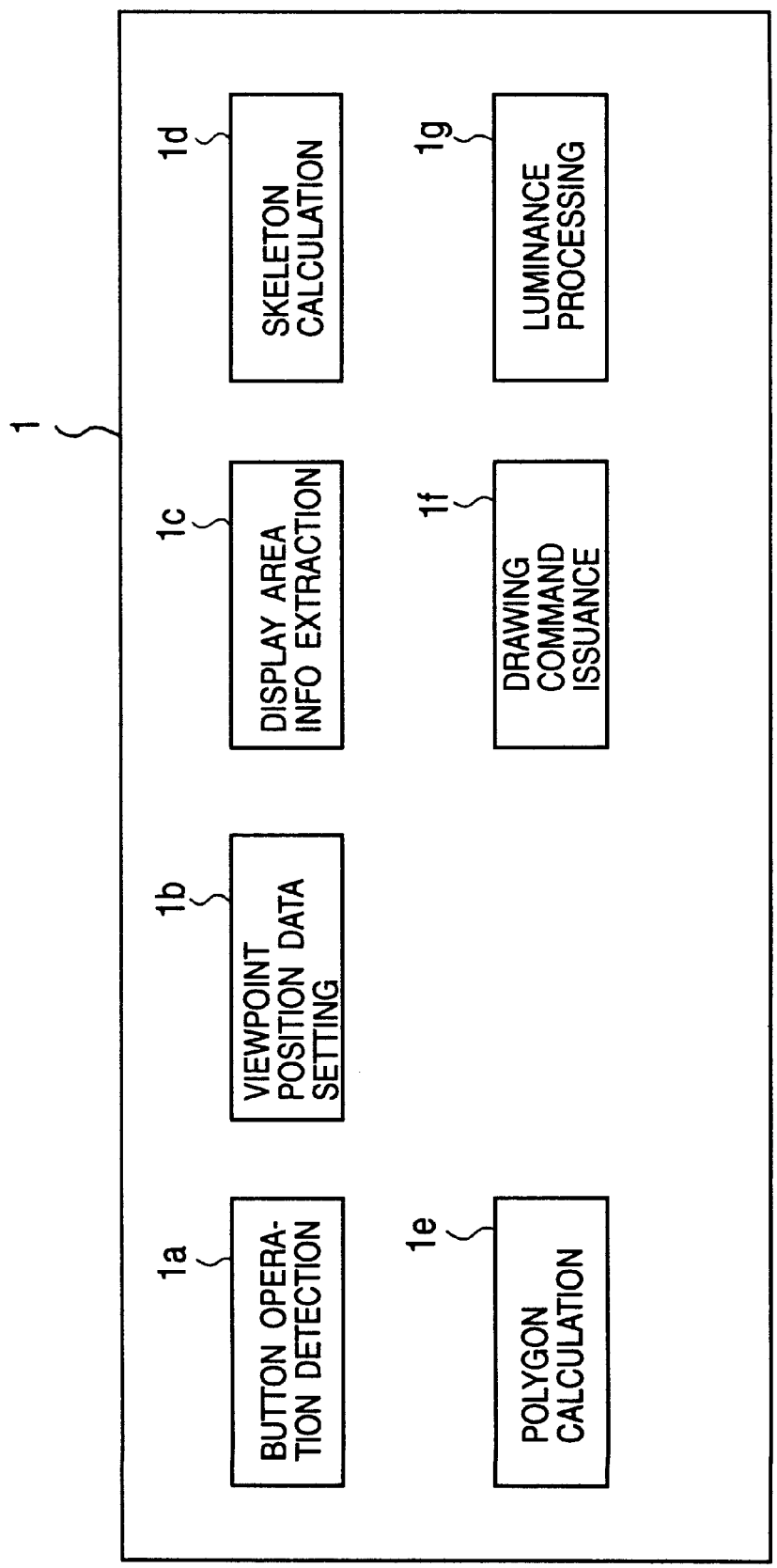
FIG. 2 is a functional block diagram showing functions of a CPU shown in FIG. 1.

See FIG. 2, which shows inherent functions the CPU 1 of FIG. 1 may offer. CPU 1 has these functions of FIG. 2 as a result of reading the program data from storage 30 of FIG. 1 and written into main memory 5. The functions of FIG. 2 are attained by a button operation detector unit 1a for detecting which button is presently activated, viewpoint position data setter 1b for defining camera viewpoint in the 3D space, display range information extraction unit 1c for determining a display region to be indicated on TV monitor 12, skeleton calculator 1d for executing later-described first and second arithmetic operations, polygon calculator 1e, drawing command issuance unit 1f, and intensity processor 1g.

This embodiment is designed so that displaying of a character(s) on TV monitor 12 is carried out based on control of rotation amount with respect to skeletons, as will be described below.

An explanation will first be given of the principle of a series of motions of a model using skeletons in conjunction with FIGS. 3 through 7.

Figure 3:
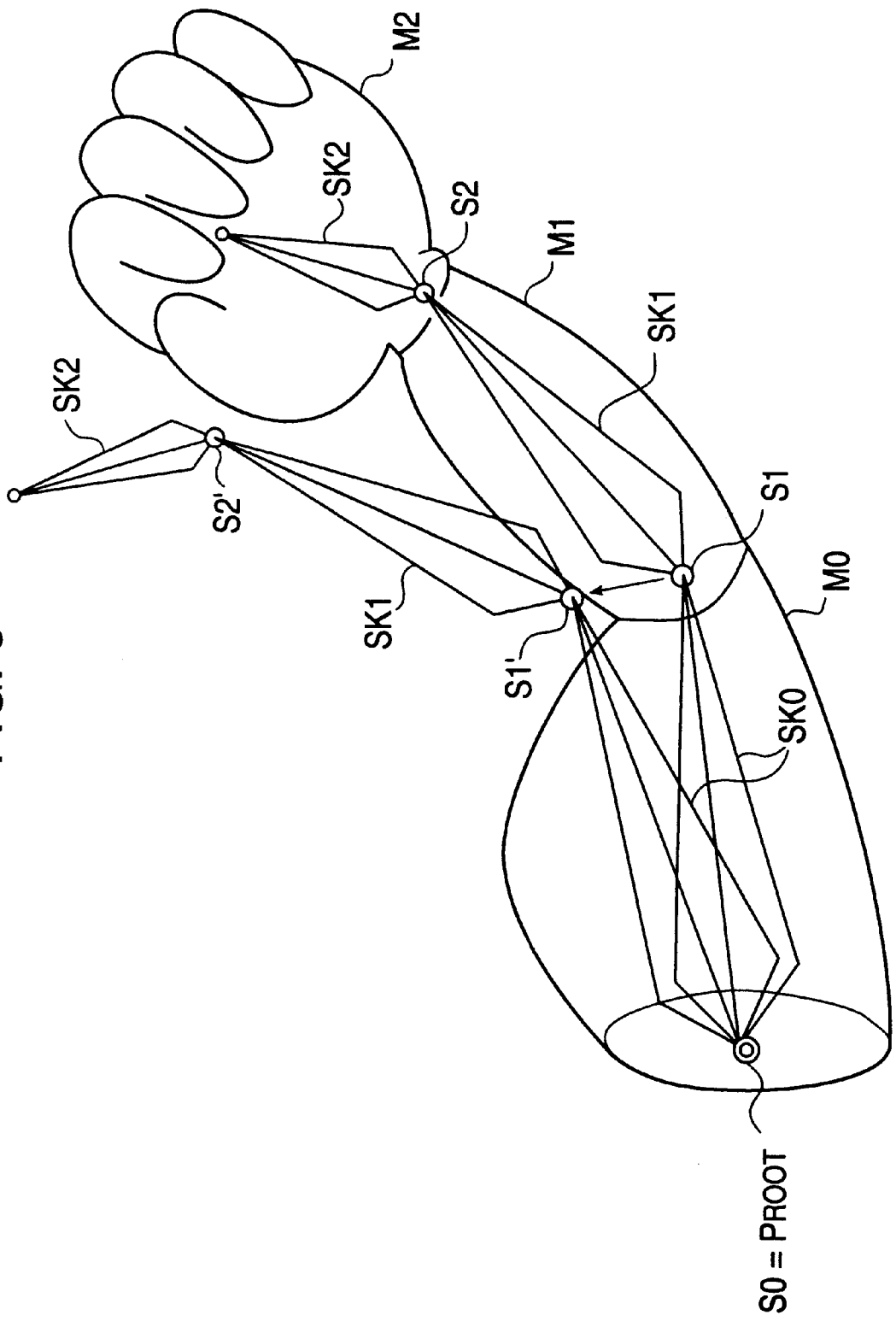
FIG. 3 is a diagram showing one extracted part of a character object which part represents its arm section.
Figure 26:
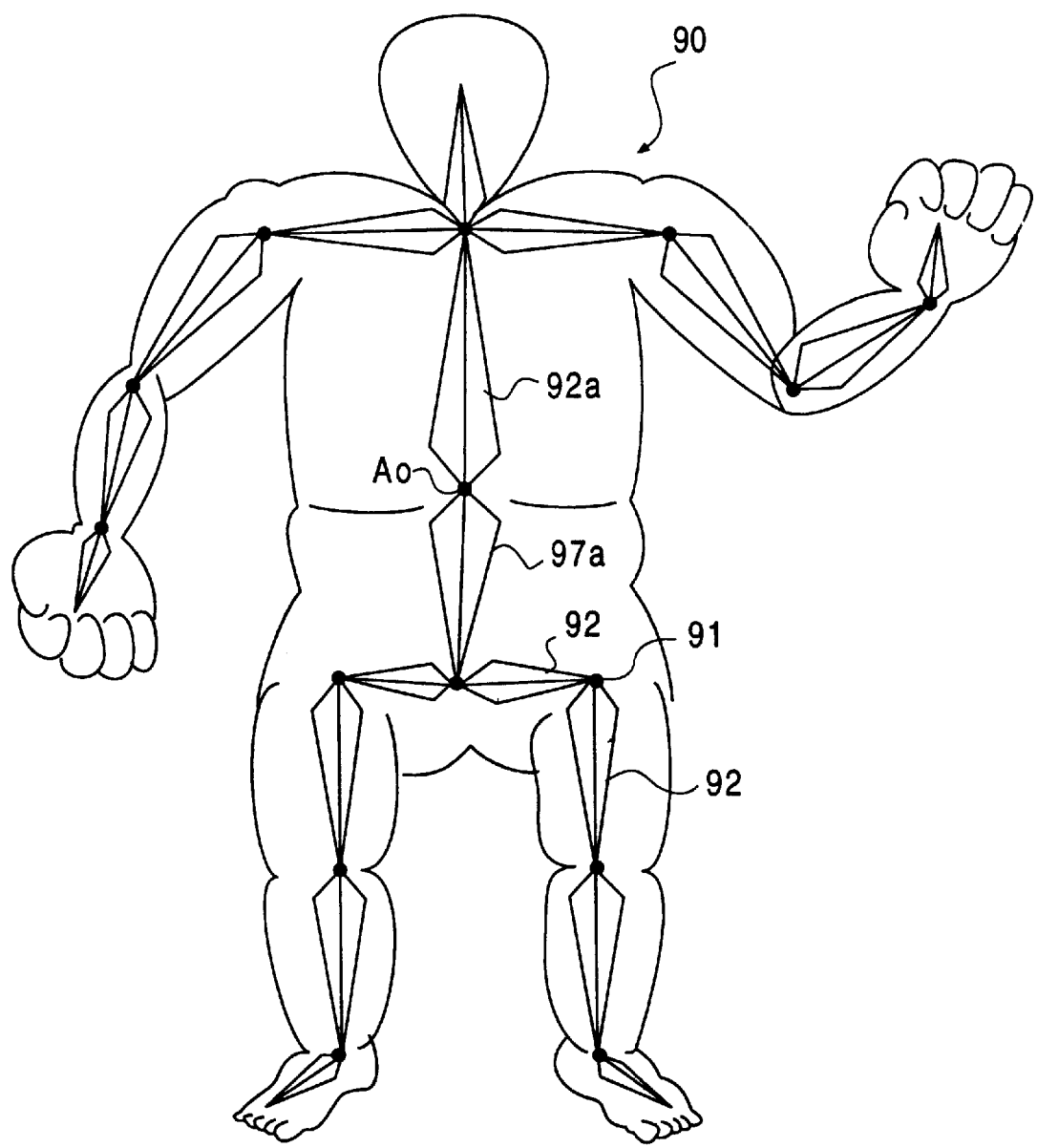
FIG. 26 is a pictorial representation of a graphics image for explanation of a scheme for utilizing a multijoint structure to achieve intended motions by use of skeletons connecting between joints thereof.

FIG. 3 illustrates one extracted graphics image component representative of an arm section of a character shown in FIG. 26. More specifically, the image of FIG. 3 is structured from three skeletons SK0 to SK2 covering from a root SO of an arm section up to its hand M2 with a plurality of models being associated therewith, which models correspond to muscle at respective skeletons SK. The term "model" as used herein may refer to a single surface figure belonging to its corresponding one skeleton, which may consist of a predefined number of polygons and a texture that may be a picture pattern as adhered to each skeleton.

It is to be noted that in the following description, some specific abbreviated expressions will be employed which follow:

WRK: Memory address at which the absolute coordinates of a character is stored.

ADD: Memory's top address whereat movement data are stored.

BON: Memory's top address where each skeleton data item is stored.

PAT: Pattern data included in one movement of a selected character.

$P_{ROOT}$: Spatial coordinates of character (same as coordinates of an origin of skeleton SK0).

GET: Intermemory top address of a selected character pattern, as given by GET=F(ADD,PAT).

Root: Skeleton SK0 directly coupled to the character's spatial coordinates (origin).

S0, S2: Spatial coordinates of skeletons SK1, SK2 (vector).

$Br_n$: Length of each skeleton SK (scalar).

R0: Angle of skeleton SK0 ($r_x$, $r_y$, $r_z$).

Rx(α): Rotation matrix for rotation α relative to X axis.

Ry(β): Rotation matrix for rotation β relative to Y axis.

Rz(γ): Rotation matrix for rotation γ relative to Z axis.

Additionally, the root is for determination of a reference position or location of the character per se; the root's position is indicated as the arm's root S0 for purposes of convenience of explanation only.

Assuming that the spatial coordinates of one endpoint or tip of skeleton SK0 is identical to the root end of skeleton SK1 (the same goes with the relation between a lower stream of skeleton and its following skeleton), the spatial coordinates S1 of an immediately lower stream of skeleton SK1 may be defined using the following formula:

$$S1 = S0 + Ry(r_y) \cdot Rx(r_x) \cdot Rz(r_z) \cdot Br_0 \qquad (1)$$

Further, using the resulting coordinates S1 of skeleton SK1 as obtained from Formula (1) and skeleton SK1's rotation amounts Rx(α), Ry(β), Rz(γ) as well as length Br1, the spatial coordinates of skeleton SK2 may be represented as:

$$S2=S1+Ry(r_y) \cdot Rx(r_x) \cdot Rz(r_z) \cdot Br_1 \quad (1)$$

In this way, it is possible at skeleton calculator 1d (by sequentially applying the relation between a "parent" skeleton and its "child" skeleton to a lower side) to obtain intended spatial coordinates of any lower stream or downstream of skeleton SK.

This relation will be explained with reference to FIG. 3. Obtain from Formula (1) the coordinates of a tip of skeleton SK0, i.e. the coordinates S1 of the base end of skeleton SK1. Then, also use Formula (1) determining the coordinates of a tip of skeleton SK1, namely the coordinates of base end of skeleton SK2. Recurrently executing such calculations results in determination of the spacial coordinates of all the skeletons SK0–SK2.

And, during the next frame period (1/30 sec.), if different rotation amount parameters Rx(α), Ry(β), Rz(γ) are added to each skeleton SK then execute based on such rotation amount the arithmetic operations of Formulas (1) and (2) sequentially along a route from the root toward the downstream direction, thus defining the base end coordinates of skeletons SK1, SK2 as new values S1', S2'. Next, let the polygon calculator 1e again calculate or recalculate based on the rotation amount and length $Br_n$ of each skeleton the vertex coordinate data of polygons forming respective models M0–M2; pass the result to the graphics data generation processor 3 for calculation of spatial coordinates; and further, allow the drawing processor 10 to receive the instruction(s) issued from the drawing command issuance unit If and accomplish visual representation of any intended actions such as arm's upward bending as shown in FIG. 3. Note here that while the illustrative skeleton shape is like an arrowhead for pictorial clarity purposes only, such skeletons are tools for polygon mapping which will never be displayed in actual scenes of TV games.

Figure 4:
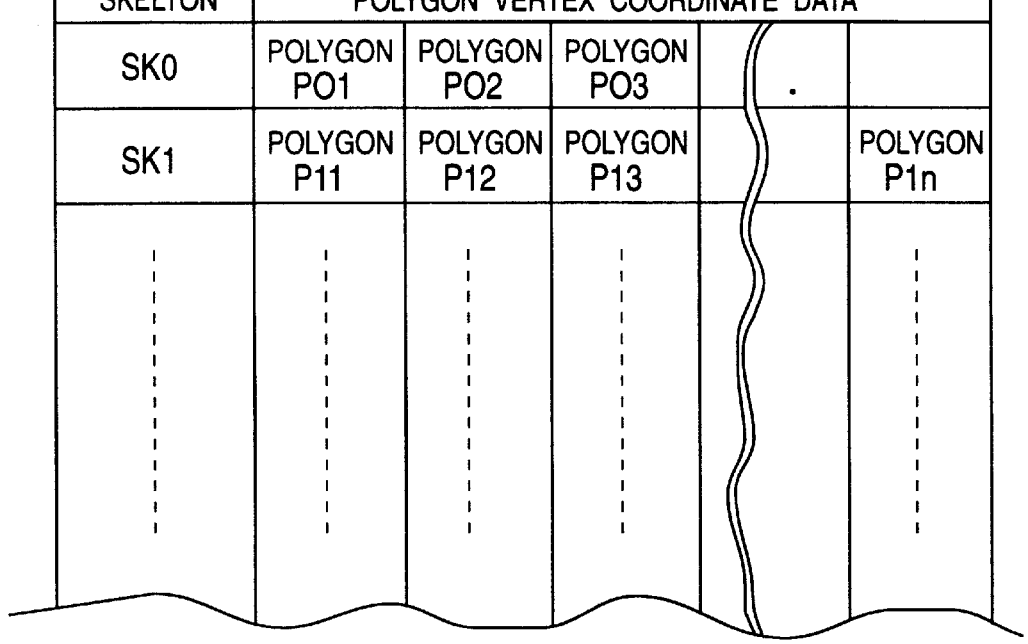
FIG. 4 is a diagram showing a table that stores data indicative of vertex coordinate data of a specified number of polygons which may constitute a model associated with each skeleton SK.

See FIG. 4. This shows a table of the main memory 5 which stores therein vertex coordinate data of a predefined number of polygons forming a model associated with each skeleton SK, which data are read out of storage 30. As shown in FIG. 4, a plurality of polygons forming each model are stored in a manner such that certain polygons shiftable and rotatable in response to each skeleton's movement are on a correspondence bases. More specifically, the vertex coordinate data P of a polygon belonging to a given skeleton SKn may be relatively defined with respect to this skeleton's spatial coordinates Sn, rotation amount Rx(α), Ry(β), Rz(γ), and length $Br_n$. Accordingly, upon determination of the coordinates Sn and rotation amount parameters Rx(α), Ry(β), Rz(γ) as well as length $Br_n$ of the skeleton SKn, there are defined by calculation in responding thereto the position and attitude (inclination, rotation angle) on the spatial coordinant system of polygon Pn belonging to such skeleton SKn. In the example of FIG. 4, the vertex coordinates and angle data of polygons P01, P02, . . . may be related to skeleton SK0; the vertex coordinates and angle data of polygons P11, P12, . . . , P1n may be related to skeleton SK1; and further, the vertex coordinates and angle data of specified number of polygons will be related to any subsequent skeletons. Note that the number of polygons belonging to each skeleton SKn may be variable depending upon models as employed.

Figures 5A, 5B:
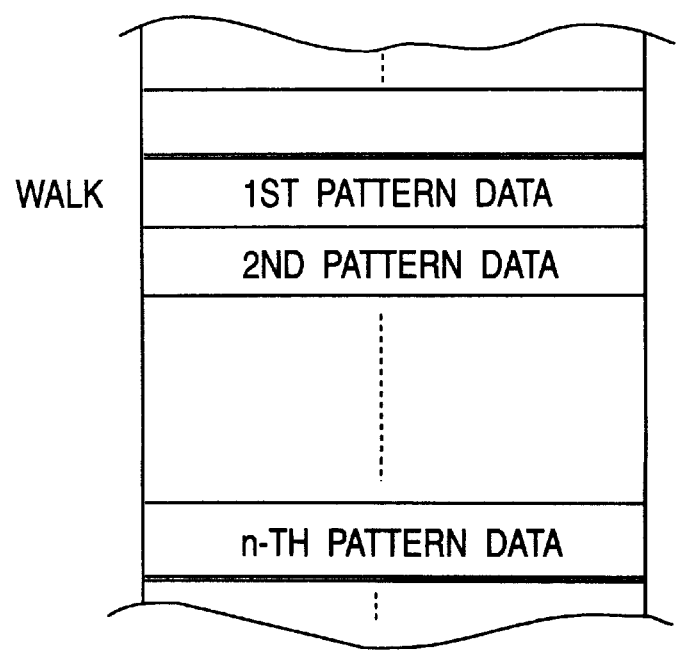
FIG. 5A is a data table for explanation of an intermemory top address GET (=F(ADD,PAT)) of a selected character pattern.
FIG. 5B is a diagram showing rotation amount data items $Rx(\alpha)$, $Ry(\beta)$, $Rz(\gamma)$ of each skeleton SK for causing a frame image indicative of every scene through movement to perform a series of motions from the first to n-th pattern data as given to each polygon.

FIG. 5A shows a data table of the main memory 5 for explanation of the top address GET (=ADD, PAT) in the memory of a selected character pattern, wherein several kinds of motions are stored in a correspondence manner, which actions may include walk (WALK), run #1 (RUN1), run #2 (RUN2), . . . , jump (JUMP) and others: where necessary, any additional desired motions or actions such as punch, kick, rotate, etc. (not shown) are stored correspondingly as far as these are recognizable by the operation buttons of controller 22 the game player operates by his or her fingers, or in some situations that one or more buttons thereof may be switched in function mode to another specific action instruction when the character being displayed is in certain action stages. When depressing a button instructs one action, a storage content is read out of its corresponding address ADD. As shown in FIG. 5B, this storage content is rotation amount Rx(α), Ry(β), Rz(γ) data of each skeleton for causing a frame image at one scene of such action to execute a series of motions which are be given to each of polygons covering from the first pattern data up to n-th pattern data. And, by reading the pattern data in the frame period and performing calculations similar to those of the aforesaid Formulas (1) and (2) as well as computation of the polygon vertex coordinates and rotation angle in the spatial coordinate system based on the calculation results, polygon vertex coordinates of FIG. 4 and angle data, it becomes possible to sequentially display frame images on the screen. Additionally, the pattern data indicative of such series of motions are such that regarding WALK for example, the first to n-th pattern data items are recurrently read enabling a walking action to be attained continuously.

Figure 6:
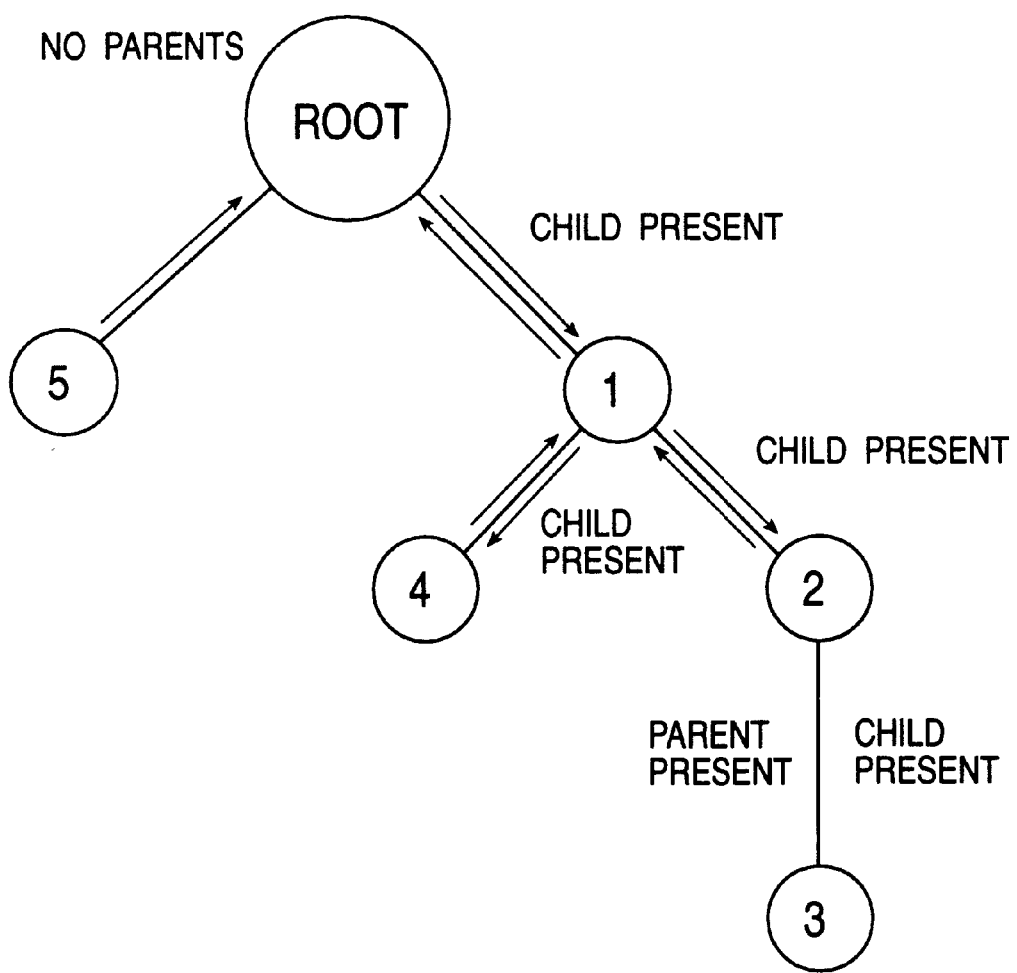
FIG. 6 is a diagram showing one exemplary object representative of an animation character as a model with five skeletons.

Next, the procedure of calculating the coordinates of skeletons forming a model in the spatial coordinant system will be explained in conjunction with FIGS. 6 and 7. FIG. 6 shows one exemplary character model with five skeletons whereas FIG. 6 is a flowchart of the skeleton coordinate calculation routine as executed by the CPU.

First, set an address at the root (designated by "ROOT" in the drawing). More specifically, after setting as $P_{ROOT}$ the coordinate data S0 of skeleton SK0 (i.e. parent) at step ST1, calculate the coordinates S1 of tip of skeleton SK0, namely at the base end or root of "child" skeleton SK1 (at step ST3, the coordinates of ① of FIG. 6). Then, determine whether any child skeleton(s) not subject to such coordinate calculation yet is/are present (at step ST5). Looking at from ① of FIG. 6, ② and ④ are not subject to intended calculation yet; therefore, ② is first calculated. More precisely, since YES at step ST5 then the routine goes next to step ST7 for setting as the coordinates of skeleton SK1's root end the coordinates of skeleton SK0's tip end as obtained at step ST3. And, calculate the coordinates of child skeleton SK2's tip end with a new skeleton SK1 being as its parent (at step ST3, the coordinates of ② of FIG. 6). If any child skeleton is present in the downstream of the present skeleton of interest, namely, if YES at step ST5, the routine repeats the processings of steps ST3 and ST7 thereby obtaining up to the coordinates of ③ of FIG. 6. After completion of the coordinates of ③ of FIG. 6, since no child skeletons are present in the downstream thereof (NO at step ST5), determine whether a parent skeleton is present (at step ST9). Since ② corresponds to such parent at ③ of FIG. 6, the routine recognizes presence of parent skeleton and thus goes to step ST11. At step ST11 the coordinates of ② of FIG. 6 are set letting the routine go back at step ST5. Since no children are present at ② of FIG. 6, the routine progresses to step ST9 for determining if any parent skeleton exists. Since ① is present as the parent at ② of FIG. 6 (YES at step ST9), the routine goes to step ST11 which sets the coordinates of ①. Here, a child as designated by ④ is associated with ①(YES at step ST5), set the coordinates of ① as a child skeleton's root end coordinates (at step ST7); then, calculate the coordinates of ④ at step ST3.

After completion of the ①'s coordinate calculation, the routine returns to the root via ① in a manner similar to that discussed supra, for calculating the coordinates of ⑤ of FIG. 6 at step ST3. In this way, when returning to the root after completion of coordinates with respect to all available child skeletons (NO at both step ST5 and step ST9), the skeleton calculation is terminated.

Figure 7:
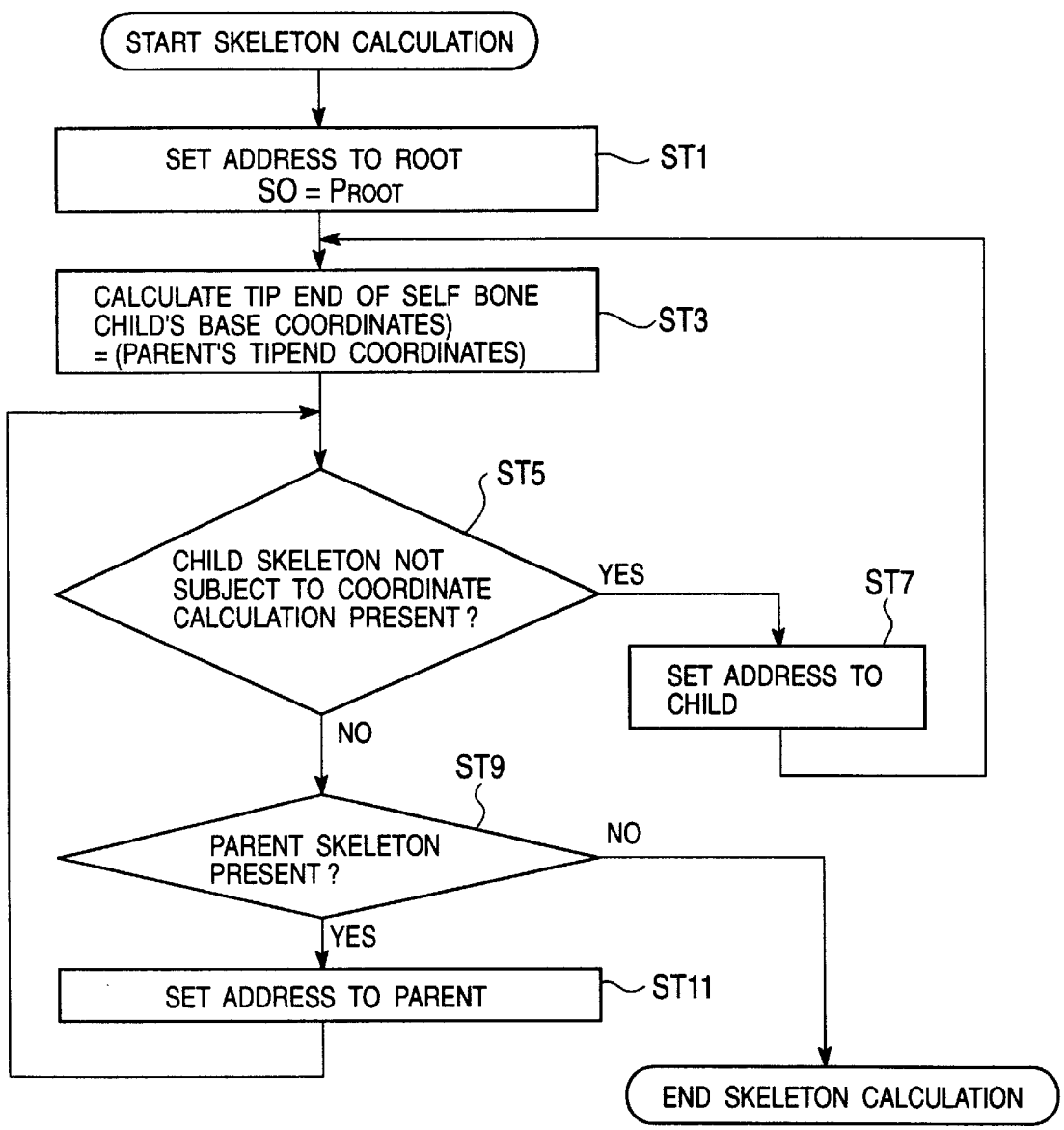
FIG. 7 is a flow diagram showing a procedure of calculation of skeleton coordinates.

And, when the skeleton coordinate calculation shown in FIG. 7 is completed, calculate the vertex coordinates and angle data of polygons being displayed based on the resulting skeleton tip-end coordinates, the rotation amount read from the table of pattern data, and length data; and further, execute texture adhesion processing after conversion to vertex coordinates and rotation angle on the 2D display screen.

Figure 8:
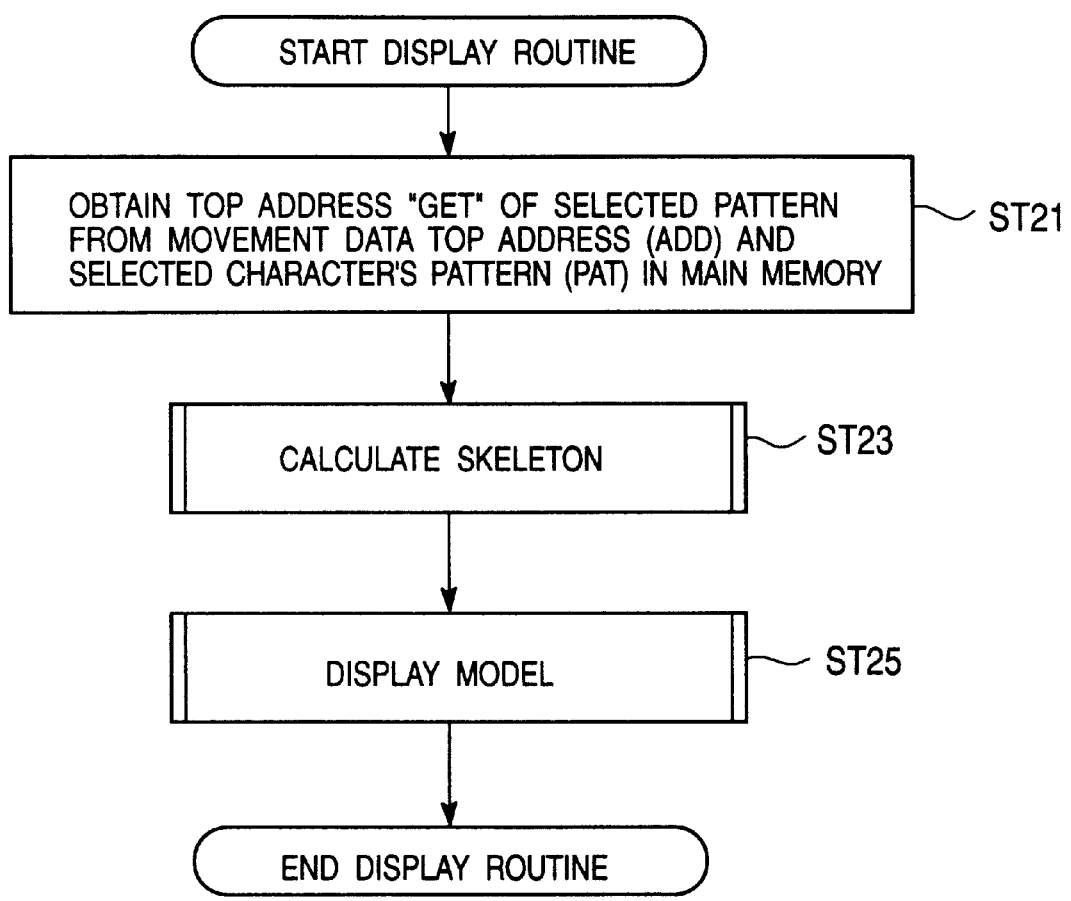
FIG. 8 is a flowchart of a display routine as executed by the CPU.

FIG. 8 shows a display routine as executed by CPU 1.

The display routine is for visually indicating a character (s) on a game screen while allowing the character being displayed to move or take actions in accordance with instructions from controller 22. Upon initiation of the display routine, read the top address ADD of movement data out of the nondisplay area of buffer 11 storing therein image data, and also read a selected character pattern PAT for obtaining the top address GET of such selected character pattern from the both data items (at step ST21). Then, read the rotation amount as stored in this top address GET— namely, the rotation amount data of each skeleton—thereby executing a subroutine of "skeleton calculation" shown in FIG. 7. Subsequently, at step ST25, execute the flow of a "model display" subroutine completing the display routine.

Figure 9:
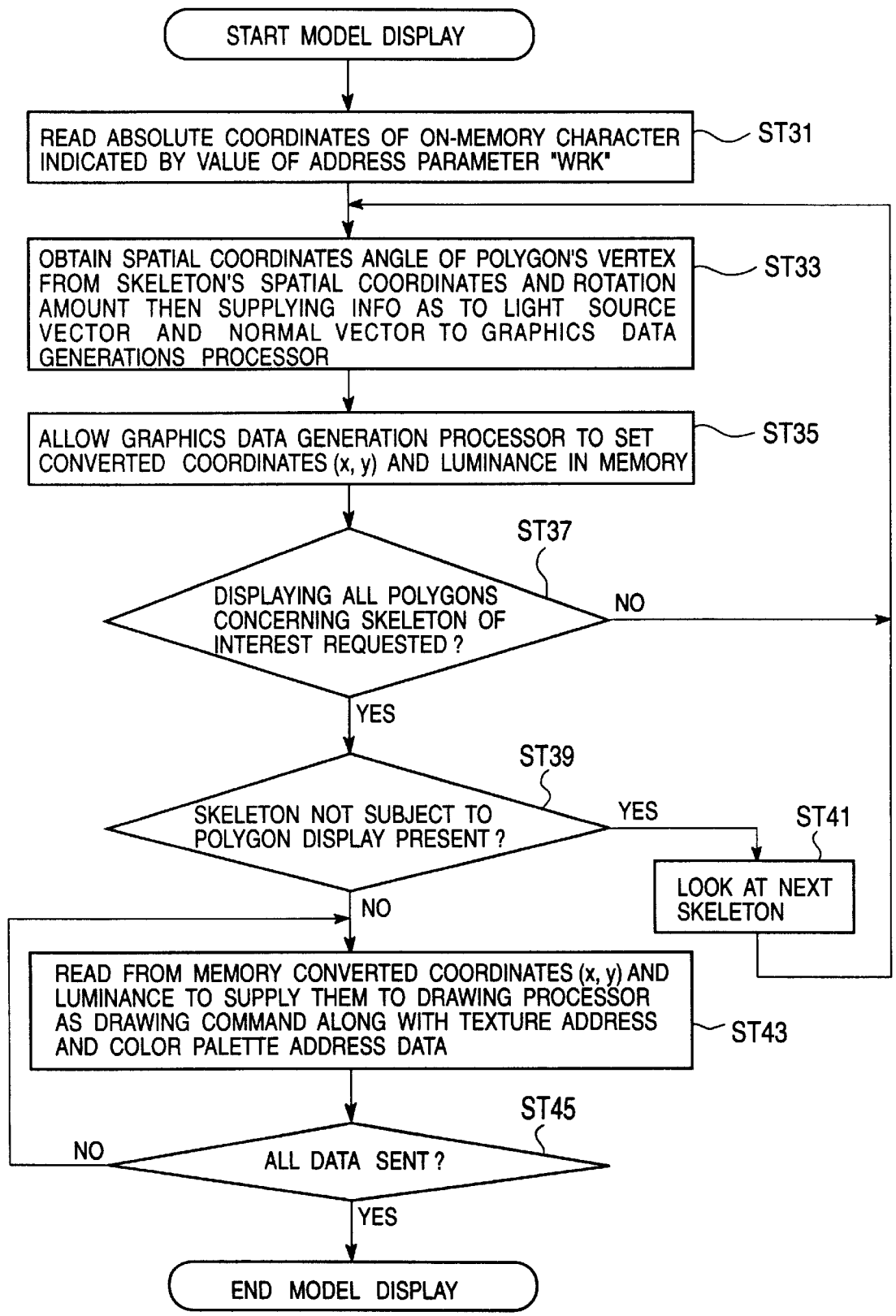
FIG. 9 is a flowchart showing a subroutine of "model display" procedure.

FIG. 9 is a flowchart of the "model display" subroutine at the step ST25.

First, read character's absolute coordinates in the nondisplay area (memory) of buffer 11 as indicated by the value of address variable or parameter WRK (at step ST31). Then, let the polygon calculation unit 1e obtain the polygon vertex coordinate and angle data from the spatial coordinates of a skeleton (equivalent to ST0) and its rotation amount supplying the data, light source vector and normal vector information to the graphics data generation processor 3 (step ST33). Graphics data generation processor 3 is responsive to such data items supplied thereto for converting the polygon vertex coordinate data to 2D coordinates (x,y) corresponding to the display screen while simultaneously determining the luminance on polygon surface as obtainable from the polygon angle data, light source vector, and normal vector information for storage therein. Then, determine or "judge" whether display request has been issued with respect to all the polygons relating to or associated with a skeleton of interest (step ST37). If such processing for all the polygons associated with the skeleton of interest then return at step ST33 to recurrently perform the processings of steps ST33 and ST35.

On the other hand, when the display processing was completed for all polygons associated with the skeleton of interest, determine whether any skeleton is still present which is not subject to such polygon displaying processing (at step ST39). If such unprocessed skeleton is found then look at the next skeleton (at step ST41) and return at step ST33 for execution of steps ST33–ST37 in a way similar to that stated supra.

After completion of intended polygon display processing with respect to all available skeletons (YES at step ST39), read out of memory (nondisplay area of buffer 11) the resultant coordinates (x,y) and luminance data then supplying them to drawing processor 10 as drawing instructions along with the texture data and color palette address data (at step ST43). Then, determine whether all data items are transferred to drawing processor 10 (step ST45): if any data are still present then return at step ST43 for continuing the data transmission processing. When transmission of all data items is completed, terminate this flow of prosecution. The foregoing processing is performed within a single frame period.

The relation of skeletons versus models will next be explained in conjunction with one exemplary character.

Figure 10A:
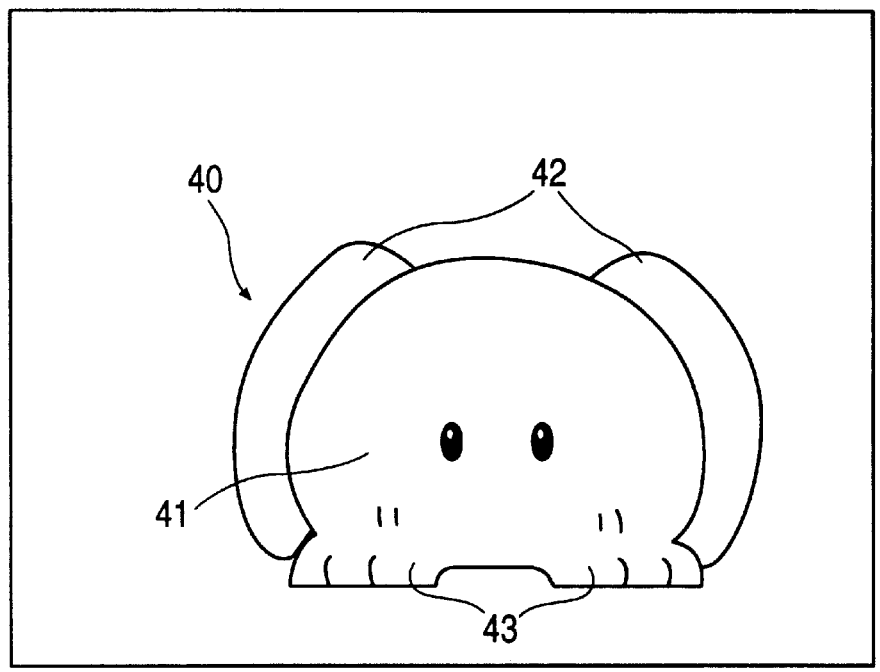
FIG. 10A is a diagram showing a front view of a first exemplary animation character image applicable to the invention in a standardized or "neutral" attitude state.
Figure 10B:
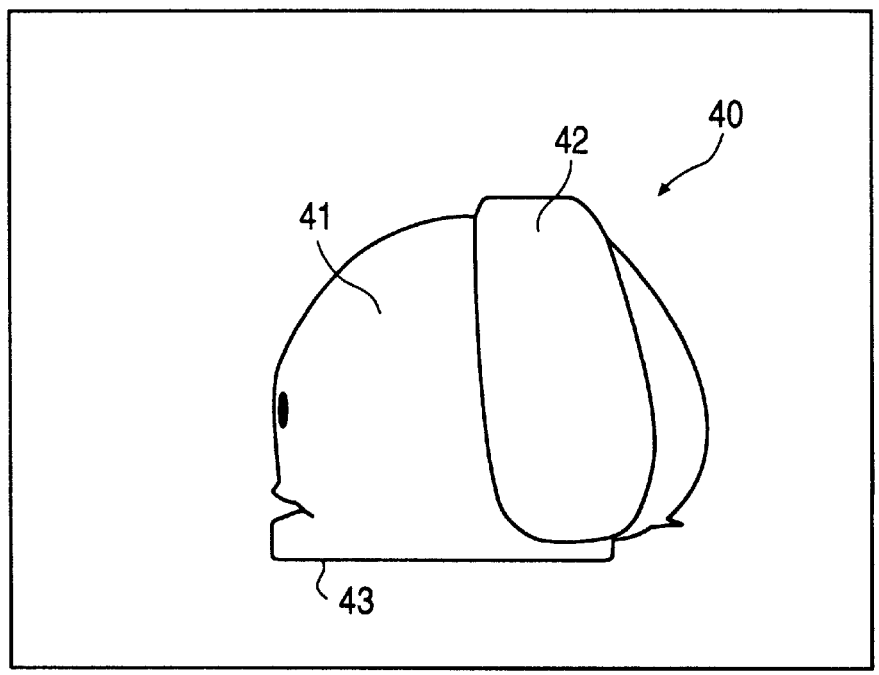
FIG. 10B illustrates a side view of the same.
Figure 11A:
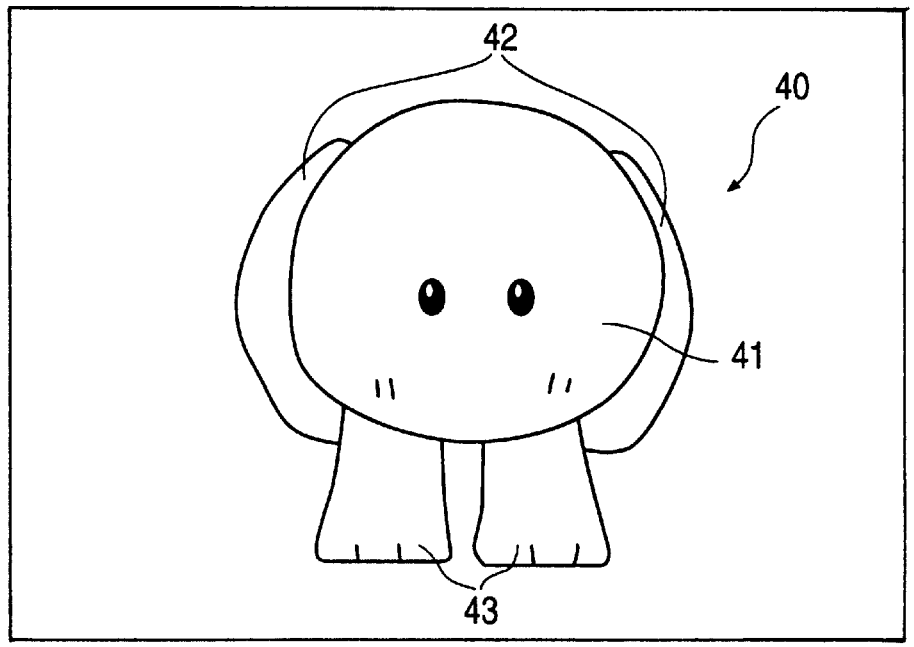
FIG. 11A is a diagram showing a front view of the character of FIG. 10A which expands vertically or "stands up"
Figure 11B:
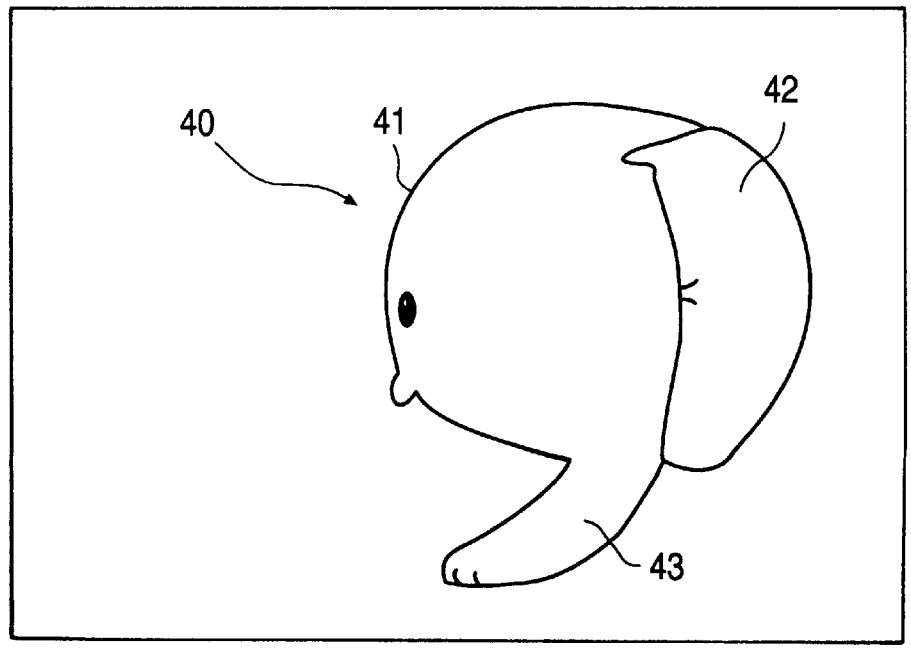
FIG. 11B is a side view thereof.
Figure 12A:
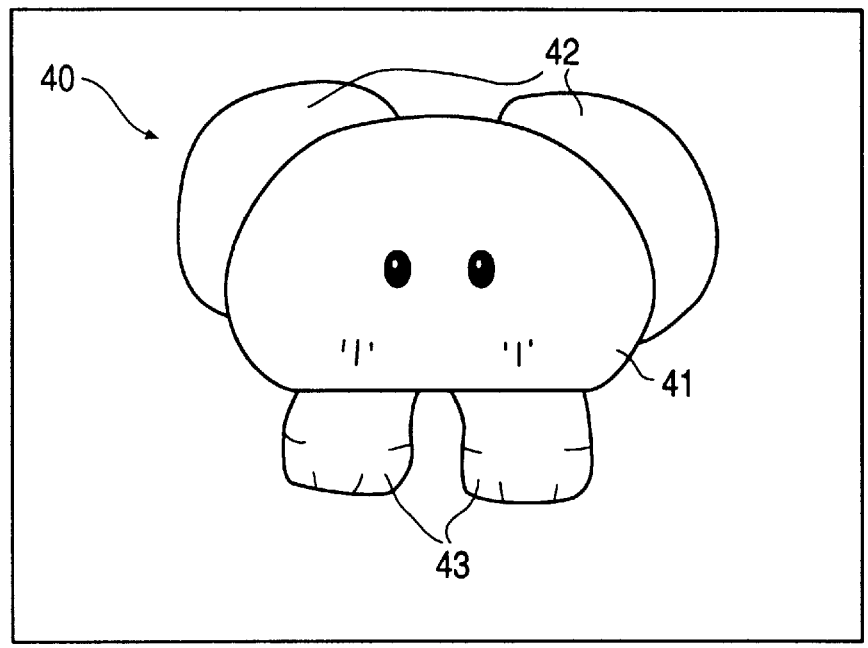
FIG. 12A is a diagram showing a front view of the character of FIG. 10A which shrunk vertically or "crouched"
Figure 12B:
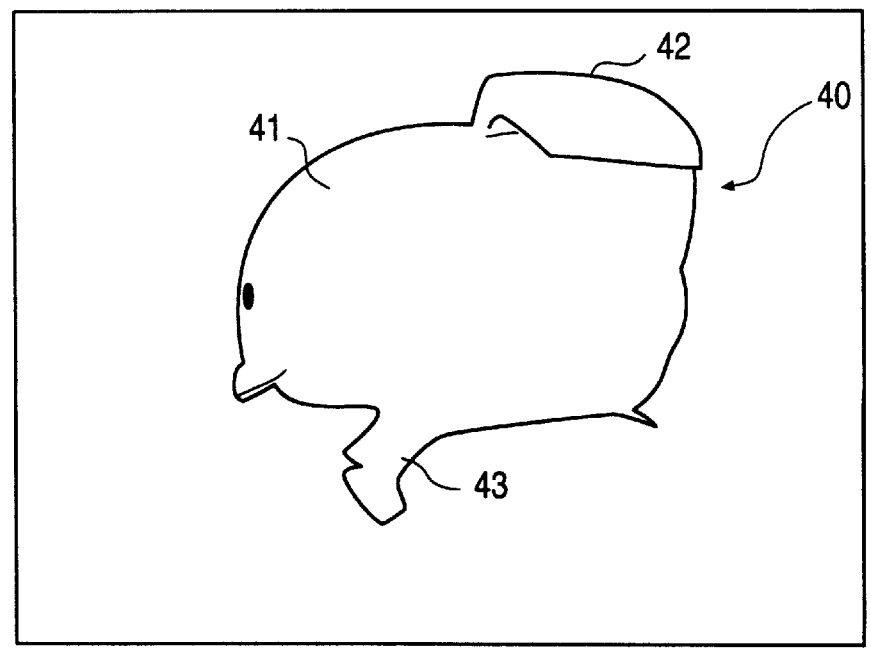
FIG. 12B is a side view thereof.

FIGS. 10A through 12B show a first exemplary animation character as employable in the system of this invention, wherein FIG. 10A depicts a front view of the character being displayed which is in a standard or "neutral" attitude state, FIG. 10B is its side view, FIG. 11A is a front view of the character which is in a vertically elongated or "stand up" state, FIG. 11B is its side view, FIG. 12A is a front view of the character in a vertically shrunk or "crouch" state, and FIG. 11B is a side view thereof.

Figure 13:
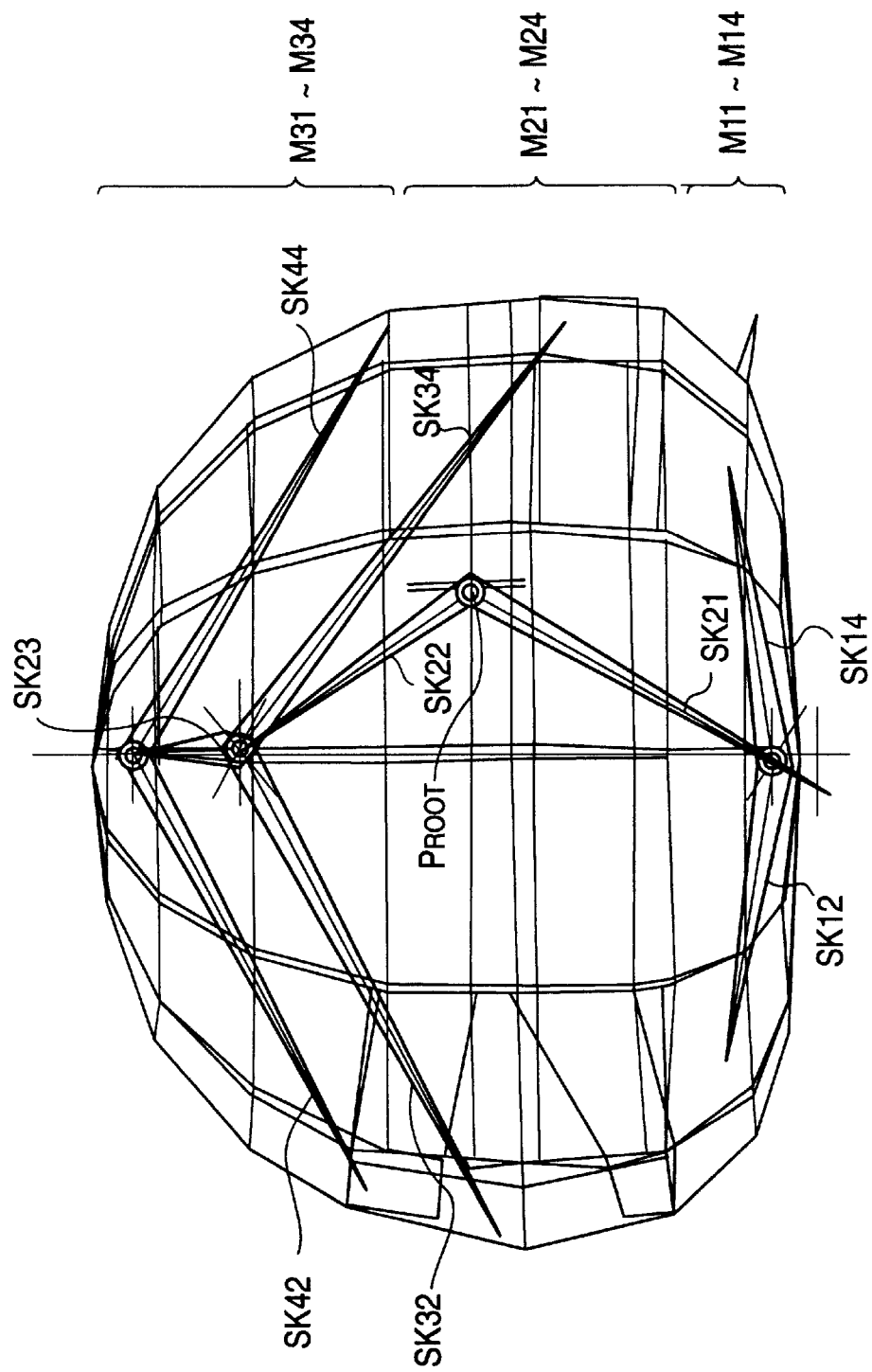
FIG. 13 is a diagram showing a side view of the first exemplary character as structured from an ensemble of skeletons and polygons in the neutral state.
Figure 14:
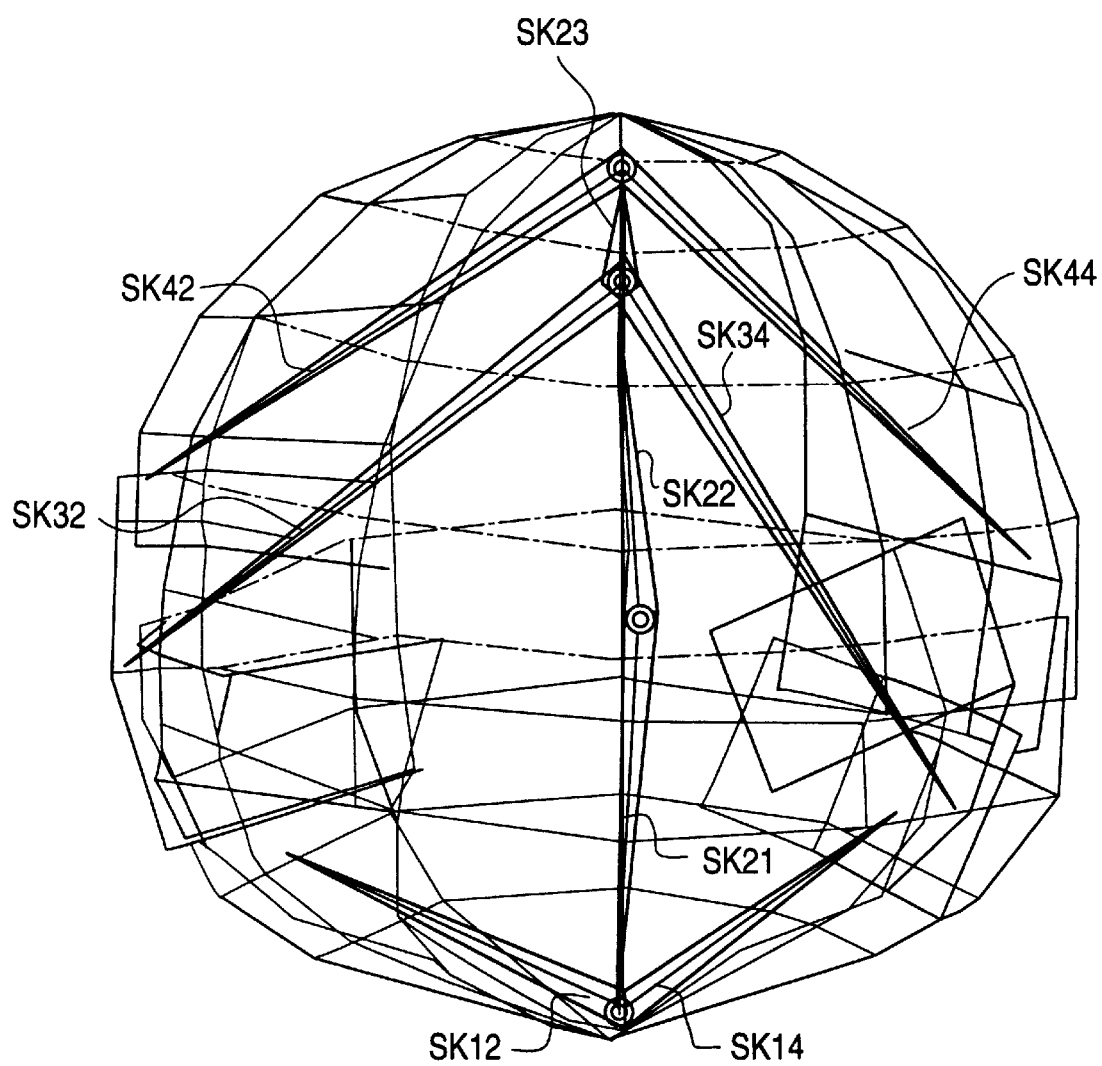
FIG. 14 is a diagram showing a side view of the first character structured from an ensemble of skeletons and polygons in the standup state.
Figure 15:
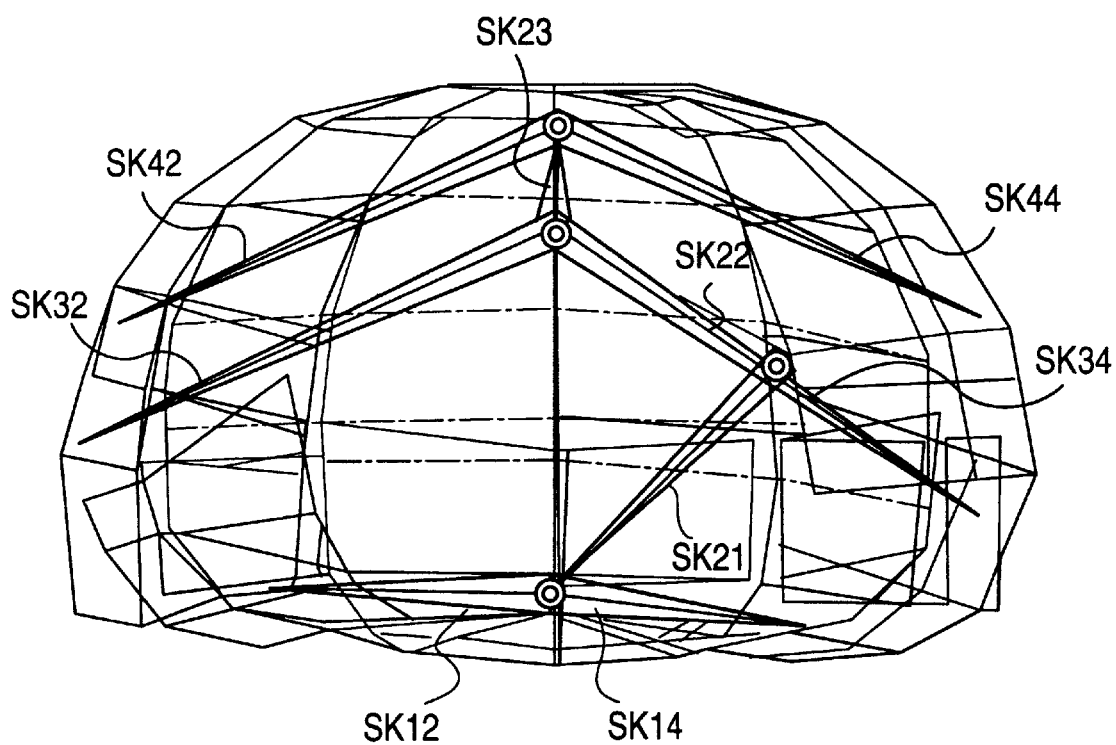
FIG. 15 is a diagram showing a side view of the first character consisting of plural skeletons and polygons in the crouch state.

See FIGS. 13–15 which illustrate the first exemplary animation character using skeletons and polygons, wherein FIG. 13 is a side view of the character in the neutral state, FIG. 14 is a side view of the same in standup state, and FIG. 15 is a side view of the same in crouch state. See also FIGS. 16–17 which show the first character with its ears and legs added thereto, wherein FIG. 16 is a front view whereas FIG. 17 is a side view.

As may be seen from FIGS. 10A–12B, the graphics object 40 may be an animation character "casted" in TV game programs which is deformation of an "animal" that generally resembles cubic in body shape; more specifically, character 40 comes with a face section 41, a pair of ears 42 on the top thereof, and both legs 43 at its bottom. Note in FIGS. 13–17 that certain triangles and/or triangles forming such cubic surface and hand/leg surfaces indicate polygons which are adhered with texture constituting character 40.

In FIGS. 13–17, a specific point $P_{ROOT}$ is centrally defined on the face 41 defining the origin of the character's coordinant system while causing this origin to be coupled with an auxiliary skeleton SK21 which extends in a vertical downward direction and two serial auxiliary skeletons SK22, SK23 extending to approach the upper side. Coupled to the tip end of auxiliary skeleton SK21 extending downwardly from the origin are four lower skeletons SK11–SK14 in a parallel (like an umbrella) in the front, rear, right and left directions (especially, see FIG. 16). Four intermediate skeletons SK31–SK34 of an umbrella shape are parallel coupled in the four directions to the tip of auxiliary skeleton SK22 serially coupled together and extending from the origin upwardly; similarly, four upper skeletons SK41–SK44 are coupled to that of auxiliary skeleton SK23.

Figure 16:
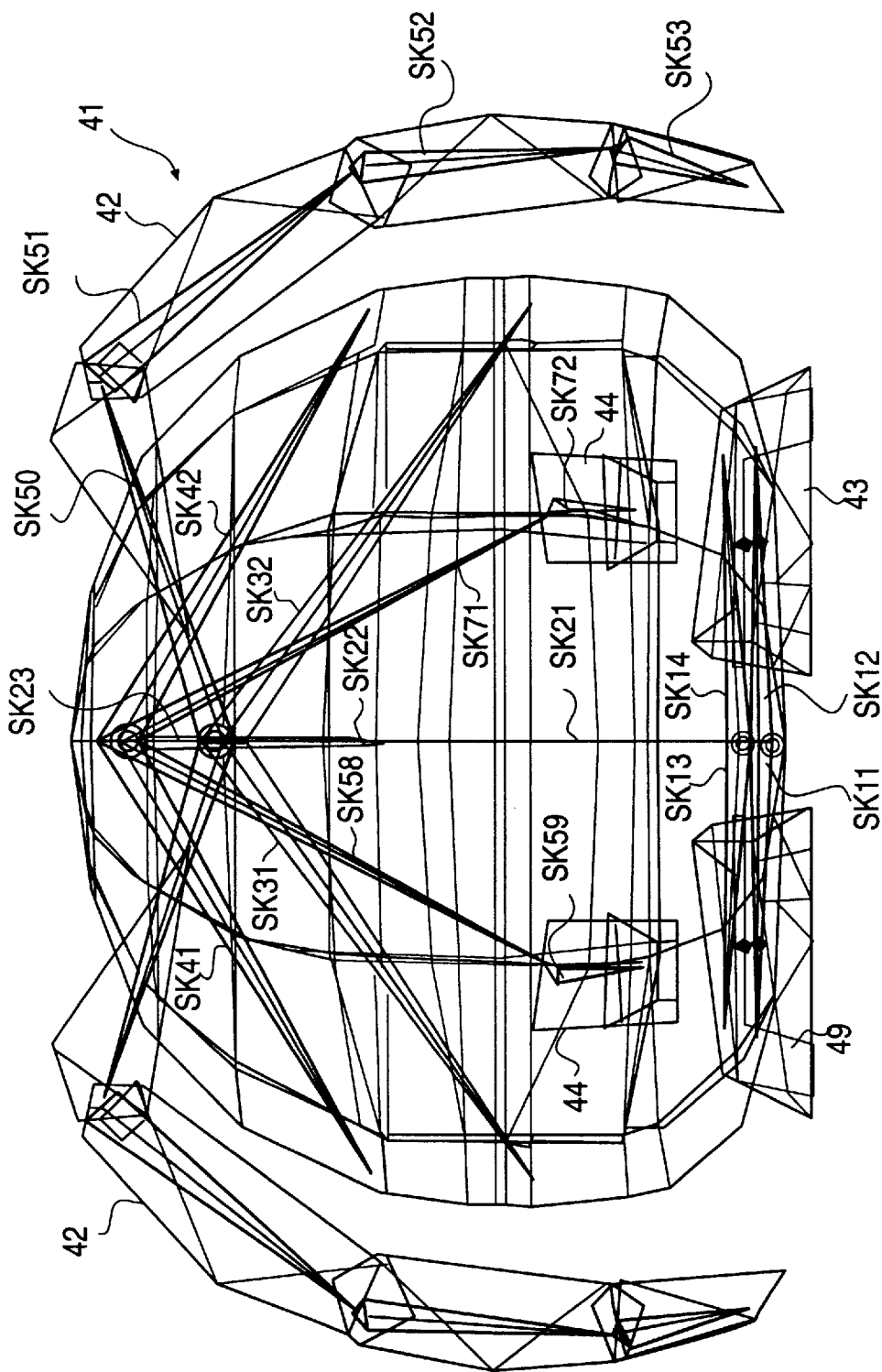
FIG. 16 is a pictorial representation of the character skeleton/polygon structure of FIG. 12 with ears and legs added thereto.
Figure 17:
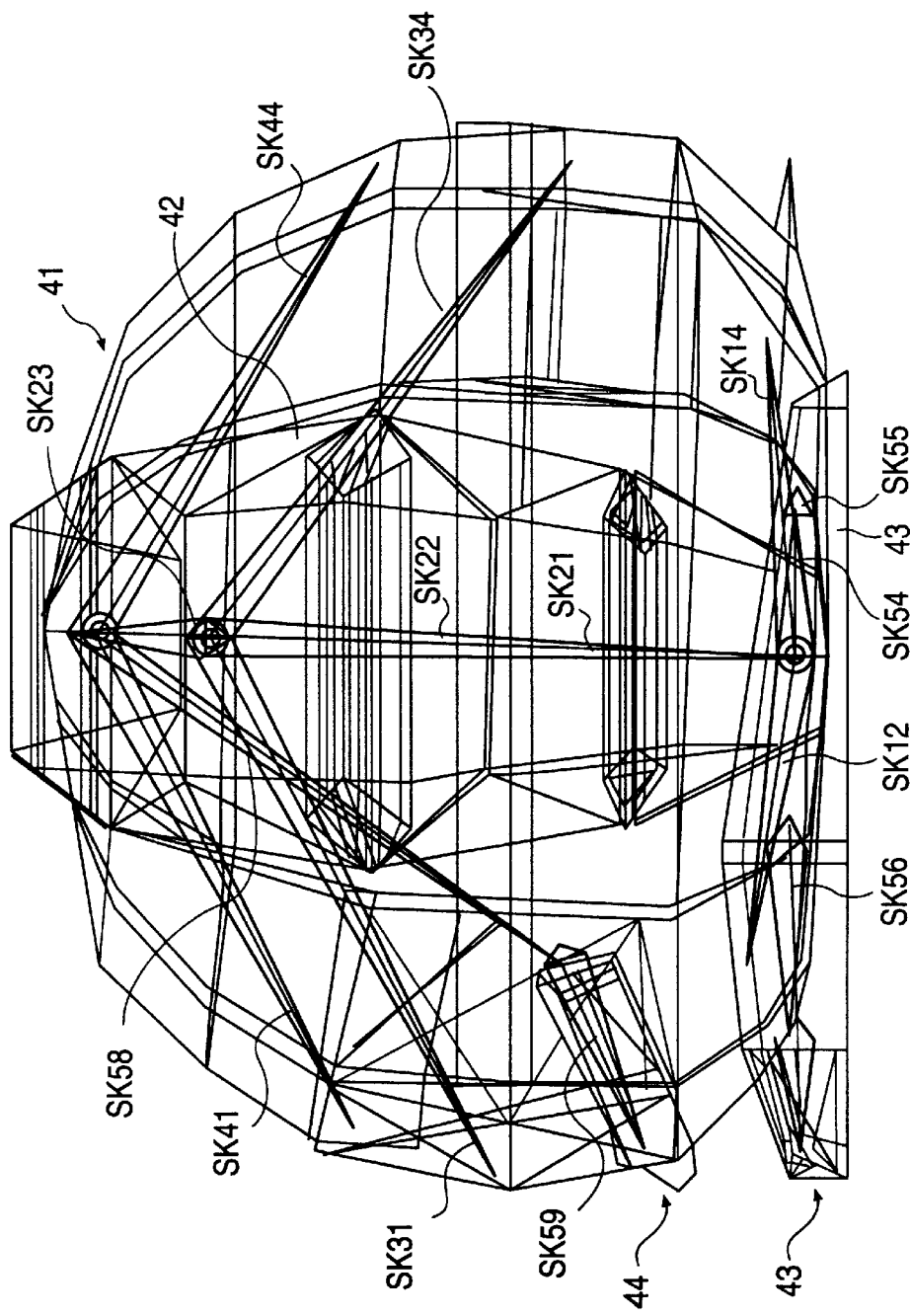
FIG. 17 is a pictorial representation of the character skeleton/polygon structure of FIG. 13 with ears and legs added thereto.

FIGS. 16 and 17 show ears 42 and legs 43 of character 40. In FIGS. 16–17, each ear 42 is associated with four skeletons SK50–SK53 as serially coupled from the distal end of auxiliary skeleton SK22 whereas each leg 43 is with four skeletons SK54–SK57 as series-coupled from that of auxiliary skeleton SK21. Further, right and left eyes 44 are associated with skeletons SK58–SK59 as serially coupled from the tip of auxiliary skeleton SK23.

It should be noted that while this embodiment assumes that the origin $P_{ROOT}$ be identical to the base end of auxiliary skeleton SK21 for purposes of convenience of explanation only, the origin $P_{ROOT}$ may alternatively be set at the leg position, i.e., the location of auxiliary skeleton SK50 for interconnection with the base end of auxiliary skeleton SK21 with at least one auxiliary skeleton (not shown) being laid therebetween thereby letting the position of origin $P_{ROOT}$ be deviated from the auxiliary skeleton base end, where necessary under arithmetic operation design.

A deformation operation of the cubic section forming the character's face section 41 will be explained which is a significant feature unique to the present invention. Polygons forming face 41 are exclusively associated with the lower skeletons SK11–SK14, intermediate or "mid" skeletons SK31–SK34, and upper skeletons SK41–SK43, respectively, in a subdivided manner such that while the cubic structure is vertically subdivided into three approximately equal portions, those polygons forming the surface of its lower portion are associated with lower skeletons SK11–SK14, those polygons forming the intermediate surface portion are with mid skeletons SK31–SK34, and the remaining polygons forming the upper surface portion are with those skeletons SK41–SK44. The lower, mid and upper polygon modules are structured so that each defines a corresponding combination of four 90-degree divided components M11–M14, M21–M24 or M31–1M34. Accordingly, this embodiment may offer capability of attaining shape changes or deformations for a respective one of twelve (12) regions as subdivided by skeletons SK11–SK14, SK31–SK34 and SK41–SK44 circumferentially into four parts each having 90 degrees and vertically into three sections.

Vertical expansion and shrink deformations may depend upon the auxiliary skeletons SK21–SK22 whereas horizontal or lateral expansion/shrink shape changes are dependable on skeletons SK11–SK14, SK31–SK34 and SK41–SK44. More particularly, where the character being displayed is in the neutral state shown in FIG. 13, the auxiliary skeleton SK31 is tilted or inclined backwardly by approximately 30 degrees, for instance, while the auxiliary skeleton SK22 coupled to the tip of auxiliary skeleton SK21 is inclined in the opposite direction thereto causing its tip end to return onto the vertical center axis. Also in such neutral state, the lower skeletons SK11–SK14 are directed almost horizontally with mid skeletons SK31–SK34 and upper ones SK41–SK44 facing downwardly by about 30 degrees, respectively. Then, calculate polygon vertex coordinates and angle data of respective models M11–M14, M21–M24 and M31–M34 associated with such skeletons SK11–SK14, SK31–SK34 and SK41–SK44, respectively.

In FIG. 14 showing the "standup" state, the auxiliary skeletons SK21, SK22 are in approximately parallel to the center line in the vertical direction with the character's body length or height being extended vertically. Also in this state, the lower skeletons SK11–SK14 are tilted by 20 to 30 degrees to the upward direction whereas the mid skeletons SK31–SK34 and upper ones SK41–SK44 are inclined about 45 degrees to the downward direction, respectively. In other words, by extending the height while causing respective skeletons SK11–SK14, SK31–SK34 and SK41–SK44 to rapidly increase in inclination, each polygon's surface is likewise inclined vertically attaining lateral shrink due to such extension of body height. Also, in order to eliminate occurrence of any dead spaces or gaps between upper and lower adjacent polygons, each polygon is designed to have a selected size that partly overlaps its neighboring one at its peripheral face edges even in the standard or "neutral" state while at the same time employing a selected color which is the same as or similar to that of its neighboring polygon(s) to ensure that such overlapping does not result in unnatural linkage of colors at boundaries therebetween.

On the contrary, in FIG. 15 that depicts the shrunk or "crouch" state, the auxiliary skeletons SK21, SK22 are forced to further increase in inclination while simultaneously letting respective skeletons SK11–SK14, SK31–SK34 and SK41–SK44 decrease in inclination adversely. Reducing or moderating the inclination of a respective one of the skeletons SK11–SK14, SK31–SK34 and SK41–SK44 may allow each polygon to be horizontally laid down accordingly to thereby ensure that when the character's height decreases, resultant lateral diameter is likewise increased providing visual enhancement to the character's body height shrinkage.

The animation character 40 is changeable in on-screen appearance in response to operations and instructions from the controller 22: by way of example, when the character jumps, its body height is displayed so that it increases as shown in FIG. 14; when the character lands on the ground, it shrinks or crouches as shown in FIG. 15. It is thus possible to display on the monitor 21 exact and precise expansion/shrinking process of the character 40, by setting so that the auxiliary skeletons SK21, SK22 continuously vary incrementally or decrementally in angle of inclination in response to every slight change of pattern data (first pattern data to n-th pattern data) with respect to each of polygons that define motions of models M11–M34 associated with the skeletons SK11–SK14, SK31–SK34 and SK41–SK44—i.e. each rotation amount $Rx(\alpha)$, $Ry(\beta)$, $Rz(\gamma)$ of skeletons SK11–SK14, SK31–SK34 and SK41–SK44.

Accordingly, it is possible to permit the character to exhibit a variety of shape change actions by employing also for such mere cube-like (ball–shaped) character with no joints and no bones the auxiliary skeletons SK21, SK22 with no associative polygons located therebetween and utilizing specific skeletons that are variable in rotation amount in operatively response to the inclination angle of auxiliary skeletons SK21, SK22.

Figure 18A:
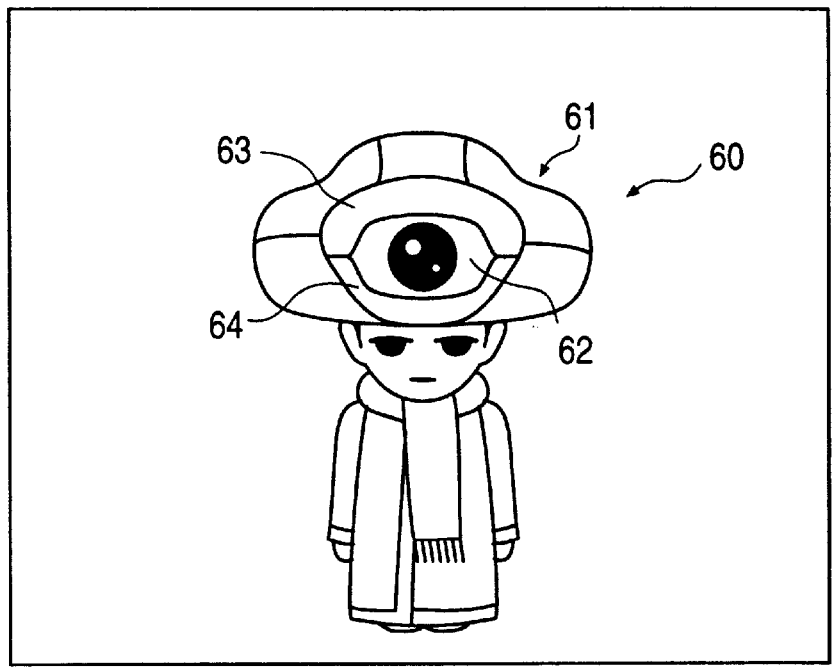
FIG. 18A shows an animation character as employable in the invention as the second example which character is in the eyelid open state.
Figure 18B:
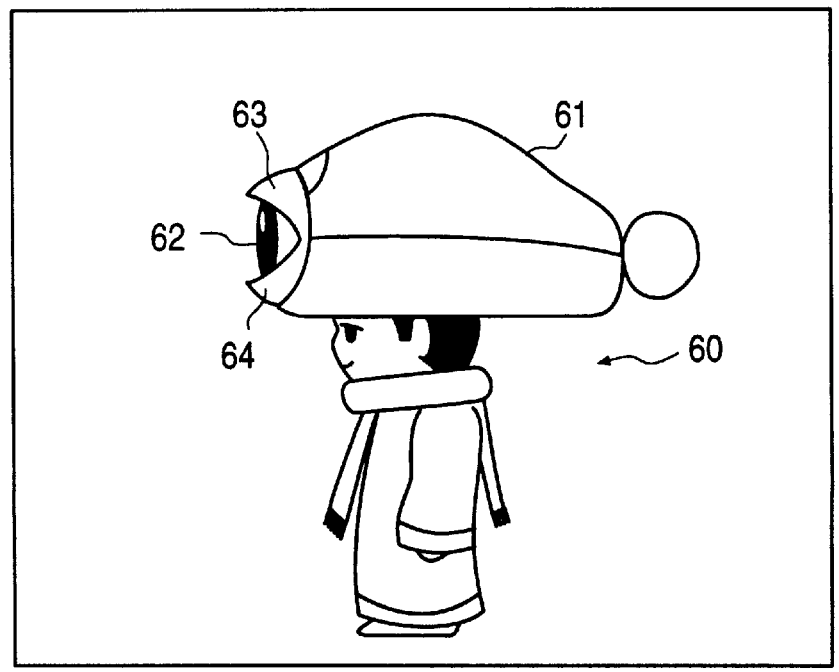
FIG. 18B is a side view of the same.
Figure 19A:
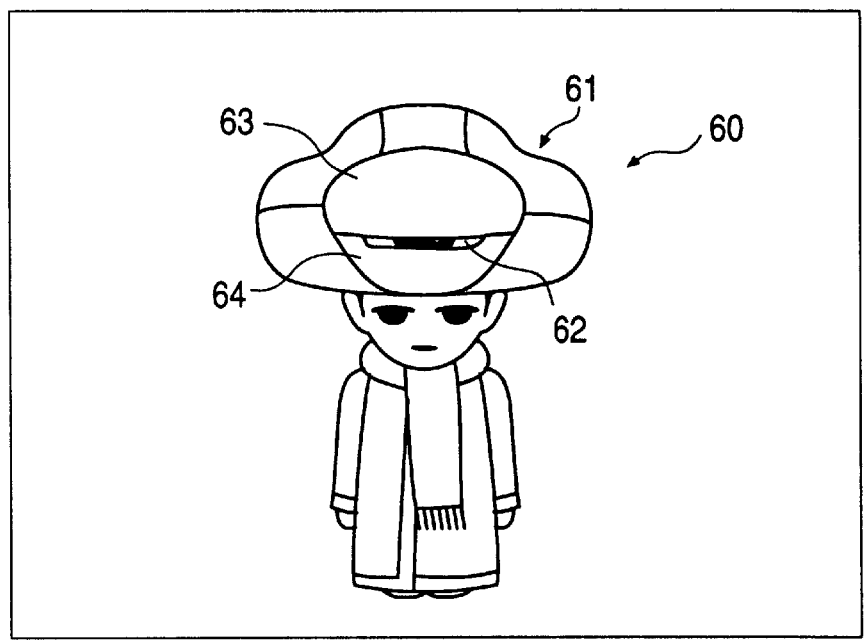
FIG. 19A illustrates the second exemplary character in the eyelid close state.
Figure 19B:
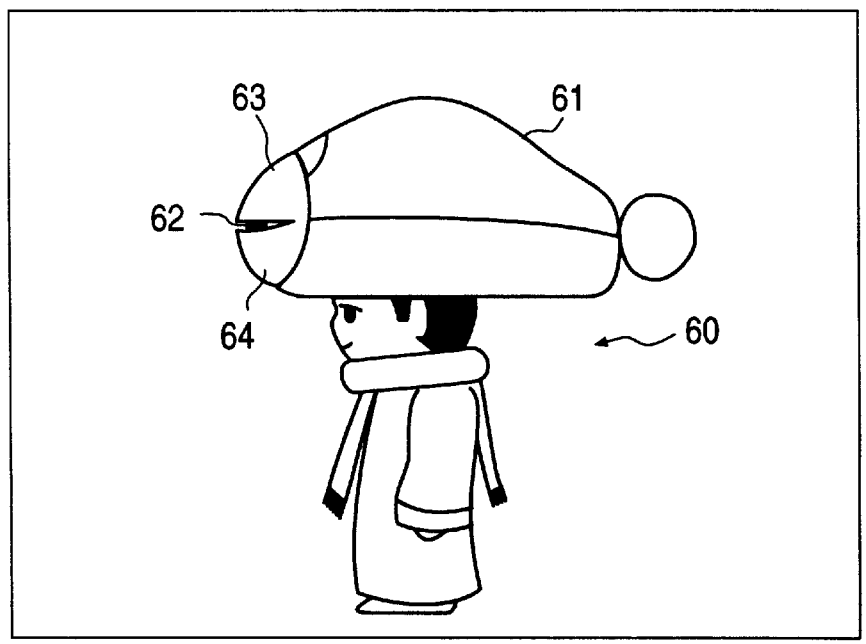
FIG. 19B is a side view of the same.

FIGS. 18A–19B are pictorial representations of the outer appearance of a second exemplary animation character as employable in the present invention, wherein FIGS. 18A and 18B depict a front view and side view of the character which has its eyes open whereas FIGS. 19A–19B are a corresponding front view and side view the same with its eyes closed.

Figure 20:
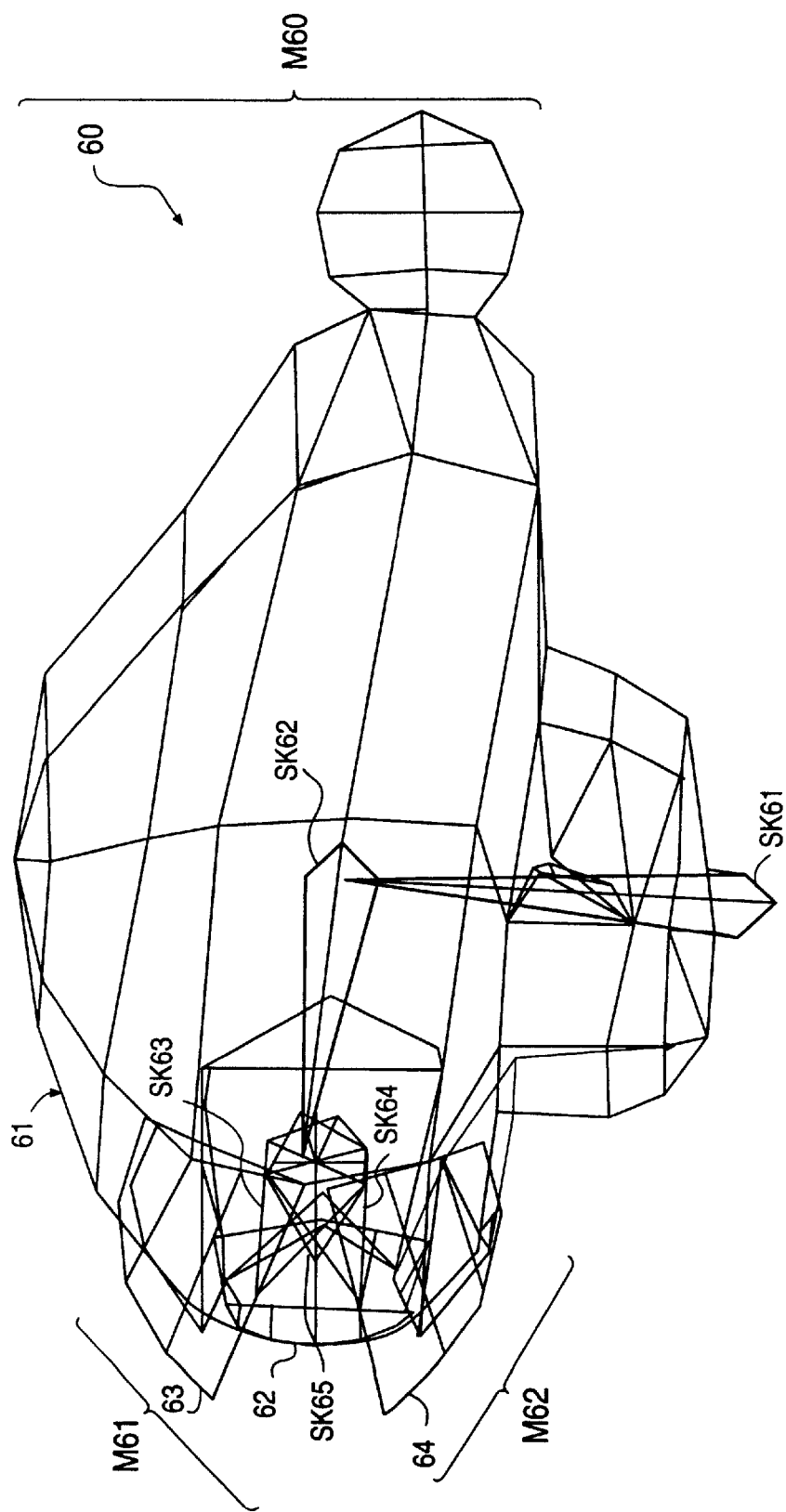
FIG. 20 depicts a wire-frame graphics image of a head section of the second character configured of multiple skeletons and polygons in the eyelid open state.
Figure 21:
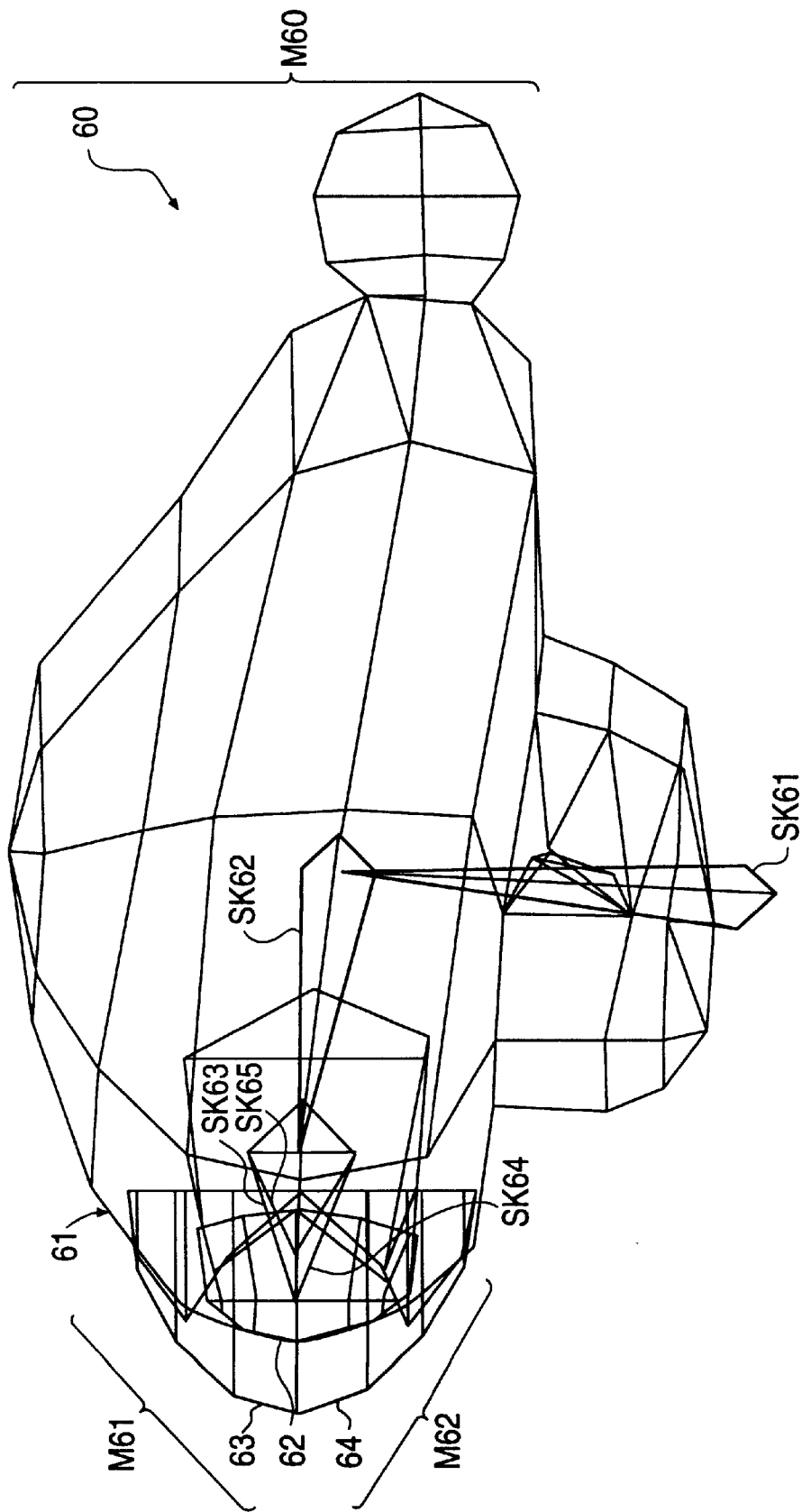
FIG. 21 shows a graphics image of a head section of the second character structured from multiple skeletons and polygons in the eyelid close state.

FIGS. 20 and 21 illustrate the head section of the second exemplary character which is represented by skeletons and polygons, wherein FIG. 21 shows a side view of it in the eye-opened state whereas FIG. 22 is a side view thereof in the eye-closed state.

As can be seen from viewing FIGS. 18A–21, the cartoon character 60 is a human-resembling one which has at upper half portion of head 61 a pair of upper and lower eyelids 63, 64 for opening/closing its pupil 62. The origin $P_{ROOT}$ not shown herein is set at the character's waist section, by way of example, while providing a skeleton (not shown) extending from it to its neck section with the tip thereof being identical to the coordinates of the base end of a skeleton SK61 (defining actions of the entire head section) extending to the head interior. Provided at the tip of skeleton SK61 is an auxiliary skeleton SK62 that is provided pointing at the head section. Two skeletons SK63, SK64 are provided at the tip of this auxiliary skeleton SK62 for use in opening and closing the eyelids 63, 64 in a way such that these skeletons extend forwardly at upper and lower levels corresponding to eyelids 63, 64; a further skeleton SK65 is provided therebetween for use in letting pupil 62 move in the up/down and right/left directions.

Frames shown in FIGS. 20–21 represent polygons respectively: the upper eyelid 63 is structured from a model M61 consisting of three polygons along the up/down directions and is associated with the skeleton SK63; similarly, the lower eyelid 64 is configured of a model M62 consisting of three polygons in the up/down directions and is associated with skeleton SK64. These skeletons SK63, SK64 are rotatable exclusively in selected—up/down or vertical—directions relative to the character's face. Additionally, the skeleton SK54 permitting movement of pupil 62 is rotatable in up/down and right/left directions relative to the face. The skeleton SK61 is associated with a model M60 consisting of remaining polygons of the head 60 so that a change in rotation amount of skeleton SK61 allows head 61 to move in up/down and right/left directions.

In FIG. 20, the skeleton SK63 is tilted by 20 degrees or more or less in the front upper direction whereby the model M61 associated with skeleton SK63 is likewise inclined by the same angle upwardly (letting the upper eyelid open). The skeleton SK64 is tilted by approximately 20 degrees in the front lower direction whereby the model M62 associated with skeleton SK64 is likewise inclined downward by the same angle (letting the lower eyelid open).

On the other hand, in FIG. 21, the skeletons SK63, SK64 face forward; due to this, the models M61, M62 associated with skeletons SK63, SK64 are each directed at the forward direction (closing the eyelids).

As shown in FIGS. 20–21, the character 60 opens or closes its eyelids 63, 64 in response to operation commands from the controller 22 or alternatively in conformity with scenes and/or criteria in the progress of a TV game installed. Hence, it is possible to display on monitor 12 delicate motions or actions such as the character 60's eye-open/close motions, by setting the inclination angle of skeletons SK63, SK64 such that these continuously vary significantly or insignificantly so as to operatively respond to every minute or fine change of the pattern data (first pattern data to n-th pattern data) with respect to each of certain polygons defining movement of the models M61, M62 associated with skeletons SK63, SK64—i.e. each rotation amount $Rx(\alpha)$, $Ry(\beta)$, $Rz(\gamma)$ of skeletons SK63, SK64.

With such an arrangement, it becomes possible to permit the models M61, M62 to precisely perform several desired, more natural actions by making use of even for the models M61, M62 with no joints and no bones the skeleton SK62 without having any associative polygons thereby to provide skeletons SK63, SK64 at any desired positions while letting the models M61, M62 with no joints/bones be associated with the skeletons SK63, SK64.

It should be noted that while in the foregoing embodiment the open/close operations of eyelids 63, 64 are responsive to operations/commands from the controller 22 stated supra, the same may alternatively be modified in a way such that the same is also performable when the character's emotional representation is to be visually indicated in cases where the character pulls itself up for a fighting posture or adversely is damaged by its contested party or "enemy" in the virtual world of fighting TV games. Additionally, upper part of the model M61 and lower part of model M62 are designed to overlap model M60 with increased priority (subject to hidden-surface processing as the front surface) thereby ensuring that no gaps occur between models M61, M62 and model M60 even when the eyelids 63, 64 are closed.

Figure 22A:
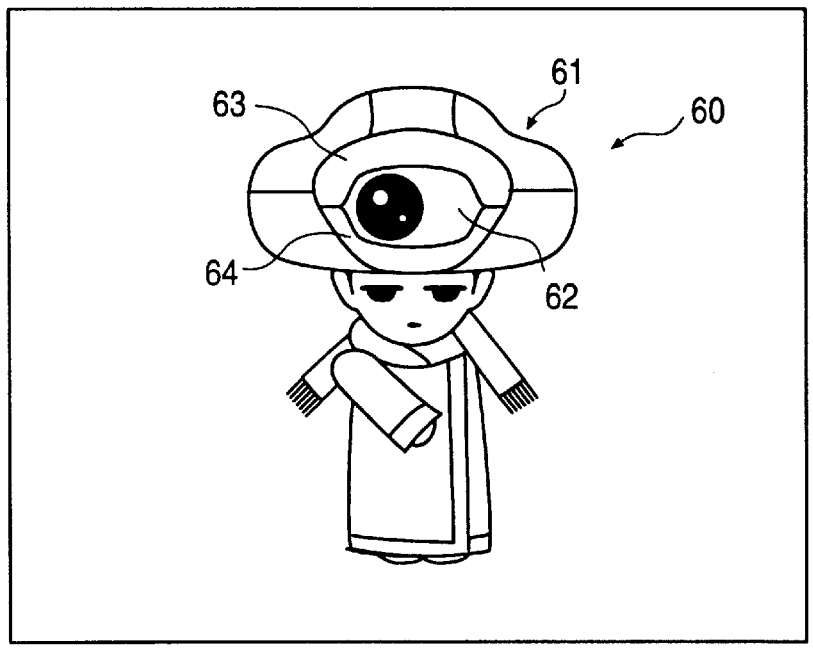
FIG. 22A is a front view of one typical on-screen display image of the second character with its eyes looking left.
Figure 22B:
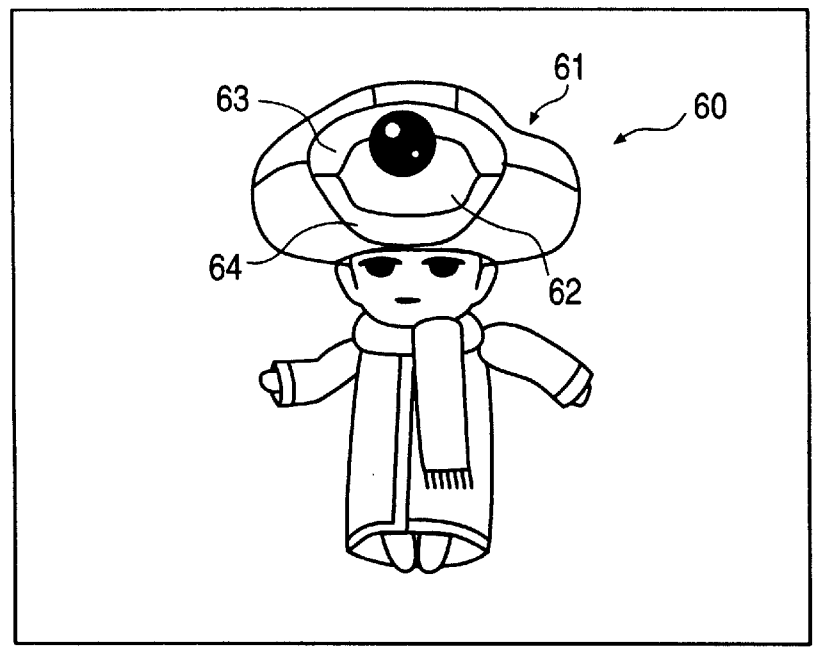
FIG. 22B illustrates the same image with its eyes look upward.

Adding certain rotation amount to the skeleton SK65 associated with the eye 62 may enable eye 62 to move vertically, i.e. upwardly or downwardly. FIGS. 22A–22B are front view diagrams showing eye 62's movement, wherein FIG. 22A illustrates one state in which eye 62 looks left wherein FIG. 22B depicts another state in which eye 62 looks up. Additionally, FIG. 18A shows the state in which eye 62 looks front. This may be modified so that eye 62 is modelled with its eyeball and pupil being separate and independent parts as divided therefrom for permitting skeleton S65 to move only the pupil in the up/down and right/left directions.

Figure 23:
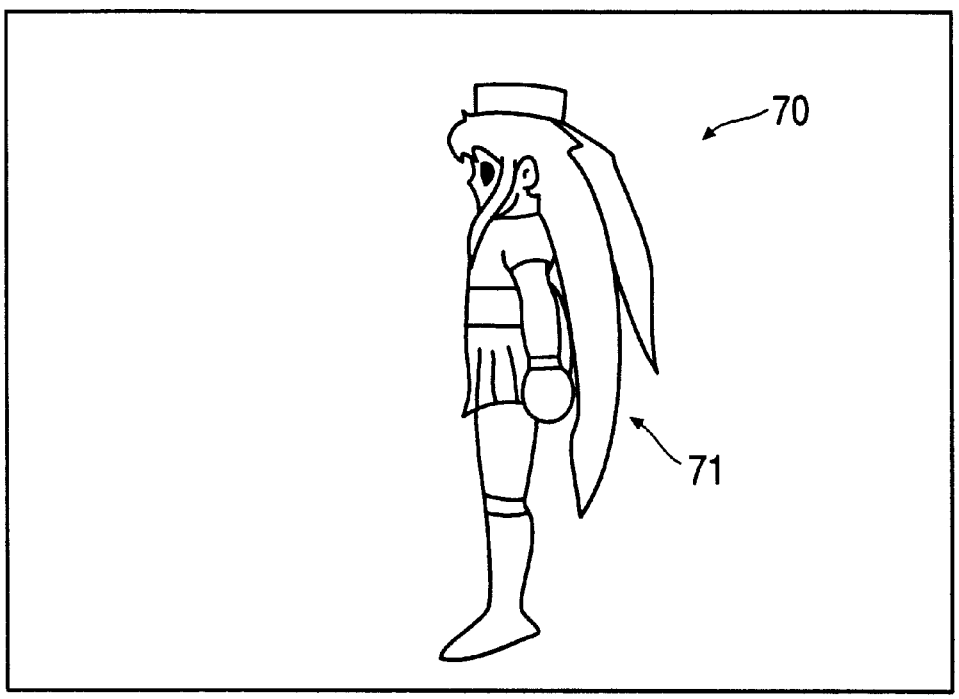
FIG. 23 is a side view of a graphics image of a third exemplary animation character also employed in the invention.
Figure 24:
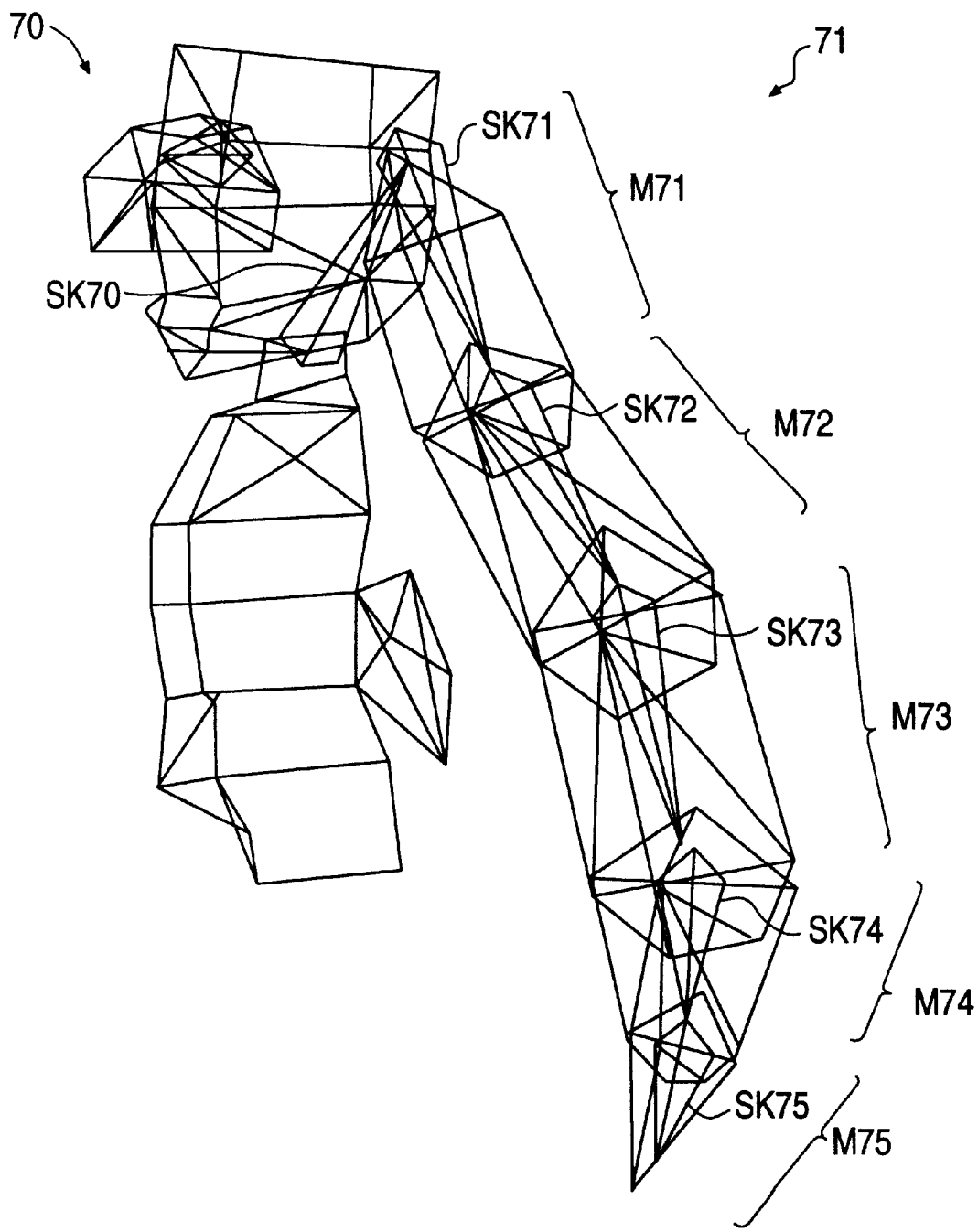
FIG. 24 depicts a graphics image of the upper half body section of the third character of FIG. 23 including its hair made up of multiple skeletons and polygons.

See FIG. 23 which shows a perspective view of a third exemplary cartoon character image as also applicable to the present invention, and FIG. 24 depicts the upper half part thereof including hair of the third character, which part is represent by skeletons and polygons.

It can be seen from FIGS. 23 and 24 that the character indicates a woman or girl with long hair 71. Although not particularly shown herein, it has the origin $P_{ROOT}$ at its waist position; a skeleton (not shown) is provided which extends from such position to the neck and has its top end to which an auxiliary skeleton SK70 extending toward the back side of the head is coupled. This auxiliary skeleton SK70 has its tip as coupled to a serial combination of a predefined number—five, here—of skeletons SK71–SK75. Respective skeletons SK71, SK72, SK73, SK74, SK75 are associated with models M71, M72, M73, M74, M75 representative of segments of the hair 71 as grown from the backside of her head, respectively.

The "girl" character 70 is designed to perform intended actions WALK, RUN1, RUN2, JUMP, etc., which are responsive to operations/commands of the controller 22. As the character 70 moves, hair bending or waving movement is given thereto in accordance with its motions. Such hair waving may be settable by the rotation amount of one or more skeletons SK in charge of this task.

Then, pattern data (first to n-th pattern data) relating to each polygon defining movement are given to the skeletons SK71–SK75. More specifically, respective rotation amount parameters $Rx(\alpha)$, $Ry(\beta)$, $Rz(\gamma)$ which are the first to n-th pattern data with respect to each polygon as set to the individual one of skeletons SK71–SK75 are designed enabling associative one of models M71–M75 to exhibit more natural wavy movement. It is thus possible, by letting such set pattern data gradually vary by minute degree, to display on monitor 12 almost natural waving movement of models M71–M75 in accordance with the character 70's motions.

In this way, it is possible to allow models M71–M75 to exhibit any desired, more natural and precise hair waving movement, by employing the auxiliary skeleton SK70 with no associative polygons even for the models M71–M75 having no joints and no bones and also providing skeletons SK71–SK75 of any desired lengths at desired positions while letting the models M71–M75 with no joints and no bones be associated with these skeletons SK71–SK75.

It should be noted that although not particularly illustrated, the neck section has a skeleton for instruction of bending and/or rotation, and further, if necessary, the skeleton structure similar to that of the second example discussed supra is employed for the eye sections, thereby enabling attainment of precise eye movement and eyelids' open/close motions.

Figure 25B:
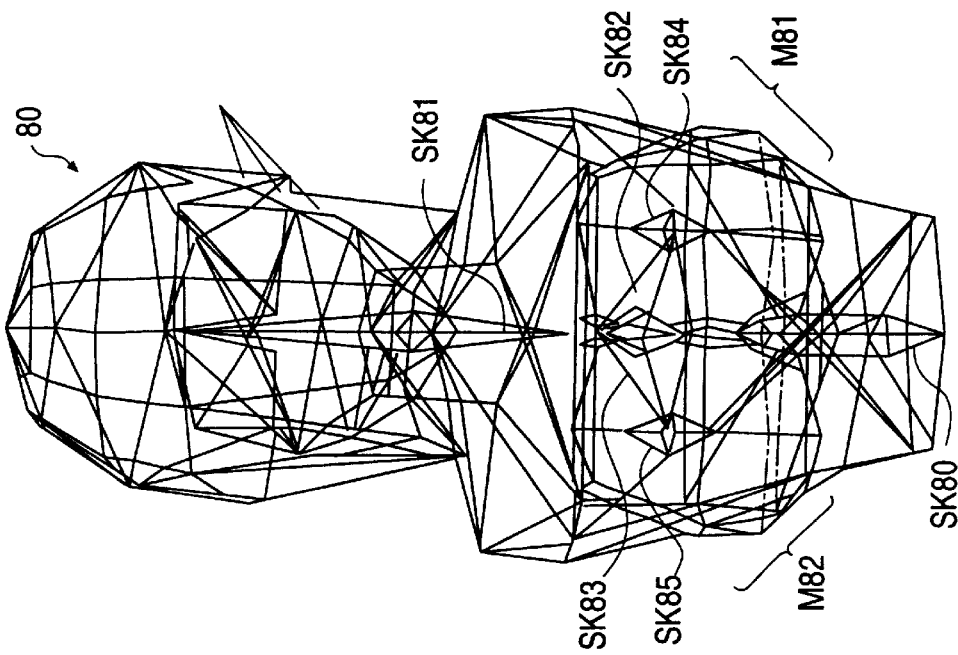
Figure 25A:
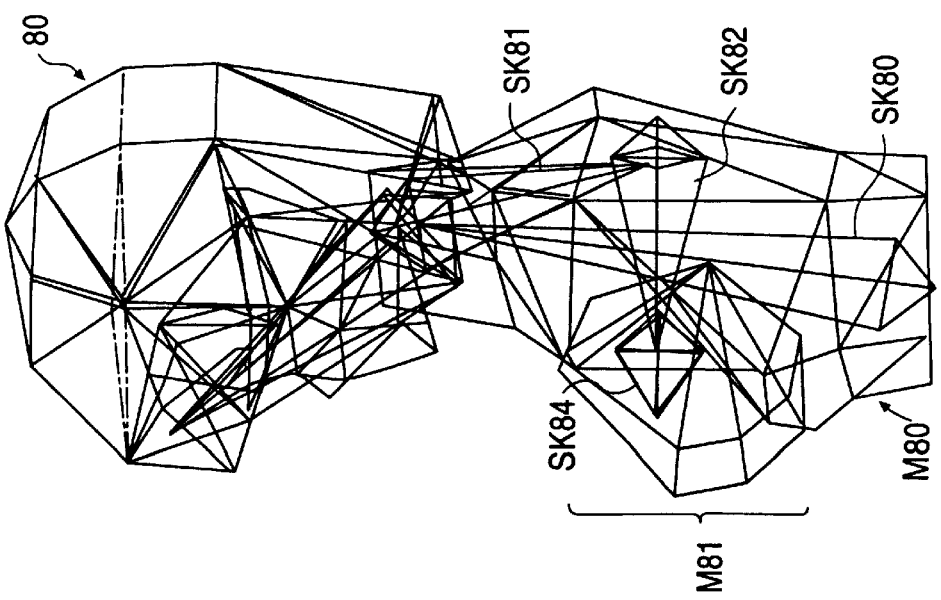

FIGS. 25A–25B show the upper half of a fourth exemplary cartoon character as applicable to the invention which consists of skeletons and polygons to represent a young lady's naked chest, wherein FIG. 25A is a side view whereas FIG. 25B is a front view thereof.

As can be seen from FIGS. 25A–25B, the "lady" character object 80 has a skeleton SK80 that extends upward from "her" waist corresponding to the origin $P_{ROOT}$. This skeleton SK80 has its tip end from which a skeleton SK81 extends along "her" vertebral column; this skeleton SK81 in turn has its tip to which a parallel combination of two auxiliary skeletons SK82, SK83 is coupled so that these project frontward to right and left breasts 81, 81. These skeletons SK82, SK83 are with skeletons SK84, SK85 which extend into interior spaces of breasts, respectively. Note here that those skeletons SK extending from the tip of skeleton SK80 to the head and both arm sections are not important in this invention; accordingly, an explanation thereof is eliminated herein.

The skeletons SK84, SK85 are dedicated in function to breasts' movement in a manner such that the model M81 consisting of multiple polygons representative of the left breast is associated with the skeleton SK84 whereas model M82 made up of multiple polygons indicative of the right breast is associated with skeleton SK85.

The "lady" character 80 is designed to perform several intended actions WALK, RUN1, RUN2, JUMP and the like. Such motions of the character 80 may provide sway or swing movement of "breast" models M81, M82 in accordance therewith. The breast swing movement is settable by the rotation amount of skeletons SK84, SK85 as dedicated thereto.

Then, the skeletons SK84, SK85 are given with certain pattern data (first pattern data to n-th pattern data) with respect to each polygon defining movement. More specifically, each rotation amount parameter $Rx(\alpha)$, $Ry(\beta)$, $Rz(\gamma)$ being the first to n-th pattern data for each polygon as set for the individual one of skeletons SK84, SK85 is designed so that it is capable of reproducing more natural sway of the models M81, M82 associated therewith, including but not limited to playback of the breasts' simultaneous up/down or vertical swing, alternate vertical swing, or lateral swing, or even diagonal shaking. Thus, it becomes possible, by letting such set pattern data gradually vary by minute degree, to display on monitor 12 almost natural swaying movement of models M81, M82 in responding to the character 70's motions.

In this way, by employing the auxiliary skeletons SK82, SK83 with no associative polygons even with respect to the models M81, M82 having no joints and no bones and providing skeletons SK84, SK85 of any desired lengths at desired positions letting the models M81, M82 with no joints and no bones be associated with these skeletons SK84, SK85, it is possible to allow models M81, M82 to exhibit desired, more natural and precise swaying or swinging movement of the breast images 81.

It should be noted that the models M81, M82 overlap in part the model M80 at the body to ensure that no gaps take place between themselves and model M80 even when models M81, M82 move vertically.

It should also be noted that where the third and fourth exemplary 3D cartoon characters 70, 80 are for use in some fighting TV games, these are specifically designed such that the models M71–M75 or M81–M82 move more naturally as the character exhibits actions as taken in attacking or defending scenes other than the motions such as WALK, RUN and the like. Additionally, the hair waving as attainable by the models M71–M75 may also be applicable to like movements of animals with much body hair.

It has been described that in accordance with the broadest concepts of the apparatus, method and the storage medium of the present invention, since an auxiliary skeleton not relating to and independent of models is specifically arranged on the upstream side of the lowest stream of skeleton, it is possible to increase the degree of freedom as to disposing the skeleton in the lowest stream for defining its corresponding model at a desired position preferable for the shape of a character upon setting of the character's relative position attitude. Whereby, settings of the relative position attitude of the lowest stream skeleton and its corresponding model may be made much easier while simultaneously enabling the model to be given with the system designer's desired precise motions or actions. Also, since the auxiliary skeleton remains free from model displaying operations, the system designer may be permitted to take into consideration only the positional relation with the lowest skeleton, making the settings much easier.

In accordance with the specific form of the inventions, a deformable constituent portion is formed at part of the character being displayed while arranging respective skeletons corresponding thereto in a way such that these are in relation to each other with the rotation amount data for use in moving corresponding models being stored in the time-axis direction. In such a form of the invention, it is possible to design variations or changes in shape of certain parts relative to those portions that do not inherently have any joints—such as vertical or lateral or even simultaneous deformation of cube-like objects, waving of long hair (hair of human females, animal's tails or the like), open/close of top and bottom eyelids, or sway of a pair of breasts—as the content in the time elapse direction such as models of the constituent portions cooperatively exhibiting precise movement.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for generating a skeleton-based dynamic picture image, comprising:

storage means for storing therein skeletons as provided for defining relative positional attitude of polygons acting as display elements of a character and a model essentially consisting of a predefined number of polygons as associated with each said skeleton;

arithmetic processor means responsive to rotation amount data supplied in accordance with operation of an operation member as one of elements defining the skeletons, for calculating a display position of a model associated with each skeleton on a two-dimensional display screen; and the improvement wherein a constituent portion comprises one or a specified number of models is deformable, and wherein each skeleton corresponding to the constituent portion are stored in said storage means in a mutually related manner thereby rendering the rotational amount data for movement of a corresponding model readable in a timebase direction;

wherein the constituent portion has a generally spherical shape and wherein those skeletons included in such generally spherical portion are certain number of ones as provided defining an umbrella in shape; and the generally spherical portion has therein a plurality of vertically coupled auxiliary skeletons which are not part of polygons, and wherein the umbrella-like skeletons are provided and elongated from at least two locations of an endpoint of auxiliary skeleton thereby defining an umbrella shape.

2. An apparatus for generating a skeleton-based dynamic picture image, comprising:

storage means for storing therein skeletons for defining relative postures of polygons acting as display elements of a character and a model which is made up of a predefined number of polygons in association with each of said skeletons;

arithmetic processor means for calculating a display position of a model associated with each of said skeletons on a two-dimensional display screen in response to an operation of an operation member; and a constituent portion, which comprises part of the character, being formed with a plurality of the models and which is generally spherical in shape, said constituent portion including an auxiliary skeleton which is not part of the model having a leading end thereof and a plurality of skeletons pivotably coupled to the leading end of the auxiliary skeleton and extending therefrom so that the auxiliary skeleton and the plurality of skeletons together form an umbrella shape, said umbrella shape being deformable.

3. The apparatus according to claim 2, wherein the constituent portion has a generally spherical shape and wherein those skeletons included in such generally spherical portion are certain number of ones as provided defining an umbrella in shape.

4. The apparatus according to claim 2, wherein the constituent portion is an image component representative of long hair on part of a character object being displayed with a plurality of skeletons being serially coupled together covering from a root up to a tip of hair.

5. The apparatus according to claim 2, wherein the constituent portion is an image component indicative of a pair of mammary glands on a chest of a character object resembling a human body while causing each of the skeletons corresponding to the constituent portion to be coupled to each endpoint of two skeletons disposed in parallel from the same position.

6. The apparatus according to claim 2, wherein the constituent portion is an image component representative of upper and lower eyelids of a character object while causing respective skeletons corresponding to the constituent portion to be disposed in parallel so that these correspond from the same position to the upper and lower eyelids respectively.

7. A method for generating a skeleton-based dynamic picture image comprising the steps of:

providing skeletons for defining relative postures of polygons acting as display elements of a character;

causing each of said skeletons to be associated with a model comprised of a predefined number of polygons;

calculating a display position of a particular model associated with each of said skeletons on a two-dimensional display screen in response to an operation of an operation member;

defining, as part of the character, a deformable constituent portion which is formed of at least one said model and which is generally spherical in shape;

providing said constituent portion with an auxiliary skeleton which is not part of the model having a leading end thereof; and pivotably coupling a plurality of skeletons to the leading end of the auxiliary skeleton and extending therefrom so that the auxiliary skeleton and the plurality of skeletons together form an umbrella shape which is deformable.

8. A computer-readable medium having stored thereon program data for generation of a skeleton-based dynamic picture image comprising executable code for execution by a computer processor causing said computer processor to perform the steps of:

providing skeletons for defining relative postures of polygons acting as display elements of a character;

causing each of said skeletons to be associated with a model comprised of a predefined number of polygons;

calculating a display position of a particular model associated with each of said skeletons on a two-dimensional display screen in response to an operation of an operation member;

defining, as part of the character, a deformable constituent portion which is formed of at least one said model and which is generally spherical in shape;

providing said constituent portion with an auxiliary skeleton which is not part of the model having a leading end thereof; and pivotably coupling a plurality of skeletons to the leading end of the auxiliary skeleton and extending therefrom so that the auxiliary skeleton and the plurality of skeletons together form an umbrella shape which is deformable.

9. An apparatus for generating a skeleton-based dynamic picture image, comprising:

storage means for storing therein skeletons for defining relative postures of polygons acting as display elements of a character and a model which is made up of a predefined number of polygons in association with each of said skeletons;

calculator means for calculating a display position of a model associated with each of said skeletons on a two-dimensional display screen in response to an operation of an operation member; and a constituent portion, which comprises part of the character, being formed with a plurality of the models and which is generally spherical in shape, said constituent portion including:

first and second auxiliary skeletons which are not part of the model and which are pivotably coupled to a specific point and extended therefrom towards mutually different directions;

a first group of skeletons which are pivotably coupled to a leading end of the first auxiliary skeleton; and a second group of skeletons which are pivotably coupled to a leading end of the second auxiliary skeleton.

* * * * *

UNITED STATES PATENT AND TRADEMARK OFFICE
CERTIFICATE OF CORRECTION

| | | |
|---|---|---|
| PATENT NO. | : 6,317,130 B1 | Page 1 of 1 |
| DATED | : November 13, 2001 | |
| INVENTOR(S) | : Hirotaka Ishikawa et al. | |

It is certified that error appears in the above-identified patent and that said Letters Patent is hereby corrected as shown below:

<u>Title page,</u>
Insert -- [74] Attorney, Agent or Firm - Jordan and Hamburg LLP --

Signed and Sealed this

Nineteenth Day of March, 2002

Attest:

Attesting Officer

JAMES E. ROGAN
*Director of the United States Patent and Trademark Office*